(12) United States Patent
Bond et al.

(10) Patent No.: US 9,495,183 B2
(45) Date of Patent: Nov. 15, 2016

(54) INSTRUCTION SET EMULATION FOR GUEST OPERATING SYSTEMS

(75) Inventors: Barry C. Bond, Redmond, WA (US); Reuben R. Olinsky, Seattle, WA (US); Galen C. Hunt, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/107,973

(22) Filed: May 16, 2011

(65) Prior Publication Data
US 2012/0296626 A1 Nov. 22, 2012

(51) Int. Cl.
*G06F 9/455* (2006.01)

(52) U.S. Cl.
CPC .................. *G06F 9/4552* (2013.01)

(58) Field of Classification Search
CPC ............ G06F 11/261; G06F 17/5027; G06F 11/3636; G06F 17/5022; G06F 9/45533; G06F 9/45504; G06F 9/3017; G06F 9/45537; G06F 9/30174; G06F 8/4434; G06F 9/45558
USPC ....................................... 703/23, 26
See application file for complete search history.

(56) References Cited

U.S. PATENT DOCUMENTS

| | | | |
|---|---|---|---|
| 4,874,164 A | 10/1989 | Miner et al. | |
| 5,309,978 A | 5/1994 | Noble et al. | |
| 5,598,563 A | 1/1997 | Spies | |
| 5,689,626 A | 11/1997 | Conley | |
| 5,732,282 A | 3/1998 | Provino et al. | |
| 5,754,830 A | 5/1998 | Butts et al. | |
| 5,815,686 A | 9/1998 | Earl et al. | |
| 5,819,091 A | 10/1998 | Arendt et al. | |
| 5,922,056 A | 7/1999 | Amell et al. | |
| 5,926,631 A | 7/1999 | McGarvey | |
| 6,357,003 B1 | 3/2002 | Zarrin et al. | |
| 6,546,425 B1 | 4/2003 | Hanson et al. | |
| 6,578,054 B1 | 6/2003 | Hopmann et al. | |
| 6,665,731 B1 | 12/2003 | Kumar et al. | |

(Continued)

FOREIGN PATENT DOCUMENTS

| | | |
|---|---|---|
| CN | 1380610 | 11/2002 |
| CN | 1906560 | 1/2007 |

(Continued)

OTHER PUBLICATIONS

Vaarala "Security Considerations of Commodity x86 Virtualization" Helsinki University of Technology Telecommunications Software and Multimedia Laboratory May 22, 2006.*

(Continued)

*Primary Examiner* — Saif Alhija
(74) *Attorney, Agent, or Firm* — Alin Corie; Sandy Swain; Micky Minhas

(57) ABSTRACT

The described implementations relate to virtual computing techniques. One implementation provides a technique that can include receiving a request to execute an application. The application can include first application instructions from a guest instruction set architecture. The technique can also include loading an emulator and a guest operating system into an execution context with the application. The emulator can translate the first application instructions into second application instructions from a host instruction set architecture. The technique can also include running the application by executing the second application instructions.

19 Claims, 9 Drawing Sheets

(56) References Cited

U.S. PATENT DOCUMENTS

| | | |
|---|---|---|
| 6,668,376 B1 | 12/2003 | Wang et al. |
| 6,721,288 B1 | 4/2004 | King et al. |
| 6,813,670 B1 | 11/2004 | Yao et al. |
| 6,874,066 B2 | 3/2005 | Traversat et al. |
| 6,876,996 B2 * | 4/2005 | Czajkowski et al. |
| 7,028,308 B2 | 4/2006 | Kim |
| 7,065,607 B2 | 6/2006 | England et al. |
| 7,185,359 B2 | 2/2007 | Schmidt et al. |
| 7,272,782 B2 | 9/2007 | Sneh |
| 7,275,105 B2 | 9/2007 | Bloch et al. |
| 7,287,259 B2 | 10/2007 | Grier et al. |
| 7,293,107 B1 | 11/2007 | Hanson et al. |
| 7,334,122 B2 | 2/2008 | Burokas et al. |
| 7,421,579 B2 | 9/2008 | England et al. |
| 7,444,337 B2 | 10/2008 | Zhou et al. |
| 7,493,626 B2 | 2/2009 | Resch |
| 7,496,495 B2 | 2/2009 | Solomon et al. |
| 7,502,823 B2 | 3/2009 | Garg et al. |
| 7,506,083 B1 | 3/2009 | Lemke et al. |
| 7,526,561 B2 | 4/2009 | Bloch et al. |
| 7,568,619 B2 | 8/2009 | Todd et al. |
| 7,574,208 B2 | 8/2009 | Hanson et al. |
| 7,574,709 B2 | 8/2009 | Erlingsson et al. |
| 7,596,783 B2 | 9/2009 | Huang et al. |
| 7,613,862 B2 | 11/2009 | Mihai |
| 7,627,728 B1 | 12/2009 | Roeck et al. |
| 7,640,009 B2 | 12/2009 | Belkin et al. |
| 7,644,264 B1 | 1/2010 | Olsen |
| 7,676,538 B2 | 3/2010 | Potter et al. |
| 7,685,593 B2 | 3/2010 | Solomon et al. |
| 7,694,139 B2 | 4/2010 | Nachenberg |
| 7,694,187 B2 | 4/2010 | Souders et al. |
| 7,703,081 B1 | 4/2010 | Buches |
| 7,703,083 B2 | 4/2010 | Shi et al. |
| 7,725,613 B2 | 5/2010 | Bhardwaj et al. |
| 7,769,720 B2 | 8/2010 | Armington |
| 7,774,762 B2 | 8/2010 | Rochette et al. |
| 7,788,669 B2 | 8/2010 | England et al. |
| 7,812,985 B2 | 10/2010 | Nguyen et al. |
| 7,844,442 B2 | 11/2010 | Tzruya |
| 7,870,153 B2 | 1/2011 | Croft et al. |
| 7,882,247 B2 | 2/2011 | Sturniolo et al. |
| 7,886,183 B2 | 2/2011 | Krishnan et al. |
| 7,913,252 B2 | 3/2011 | Shlomai |
| 7,937,612 B1 | 5/2011 | Lyadvinsky et al. |
| 7,971,049 B2 | 6/2011 | TeNgaio et al. |
| 7,990,823 B2 | 8/2011 | Tanaka et al. |
| 7,996,493 B2 | 8/2011 | Hill |
| 8,010,710 B2 | 8/2011 | Sumi |
| 8,019,861 B2 | 9/2011 | Ginzton |
| 8,060,656 B2 | 11/2011 | Hanson et al. |
| 8,064,598 B2 | 11/2011 | Vaha-Sipila |
| 8,065,444 B2 | 11/2011 | Lemke et al. |
| 8,074,231 B2 | 12/2011 | Hunt et al. |
| 8,117,554 B1 | 2/2012 | Grechishkin et al. |
| 8,131,919 B1 | 3/2012 | Gasser et al. |
| 8,135,877 B2 | 3/2012 | Wang |
| 8,150,971 B2 | 4/2012 | Lublin et al. |
| 8,195,774 B2 | 6/2012 | Lambeth et al. |
| 8,196,153 B1 | 6/2012 | de Cesare et al. |
| 8,214,849 B2 | 7/2012 | Cooper |
| 8,237,970 B2 | 8/2012 | Nguyen et al. |
| 8,285,987 B1 | 10/2012 | Kimball et al. |
| 8,332,652 B2 | 12/2012 | Boivie |
| 8,346,983 B2 | 1/2013 | Lim et al. |
| 8,347,063 B2 | 1/2013 | Panesar et al. |
| 8,407,727 B2 | 3/2013 | Eom et al. |
| 8,418,236 B1 | 4/2013 | Havemose |
| 8,424,082 B2 | 4/2013 | Chen et al. |
| 8,429,654 B2 | 4/2013 | Chao et al. |
| 8,436,944 B2 | 5/2013 | Murase et al. |
| 8,453,253 B2 | 5/2013 | Strong et al. |
| 8,463,951 B1 | 6/2013 | Priem |
| 8,505,029 B1 | 8/2013 | Chanda et al. |
| 8,645,977 B2 | 2/2014 | Jacobson et al. |
| 8,903,705 B2 | 12/2014 | Douceur et al. |
| 8,954,752 B2 | 2/2015 | Boivie |
| 2002/0019972 A1 | 2/2002 | Grier |
| 2002/0069192 A1 | 6/2002 | Aegerter |
| 2003/0208595 A1 | 11/2003 | Gouge et al. |
| 2003/0217174 A1 | 11/2003 | Dorenbosch et al. |
| 2003/0233404 A1 | 12/2003 | Hopkins |
| 2004/0015537 A1 | 1/2004 | Doerksen et al. |
| 2004/0168030 A1 | 8/2004 | Traversat et al. |
| 2004/0172629 A1 | 9/2004 | Tene et al. |
| 2004/0177243 A1 | 9/2004 | Worley, Jr. |
| 2005/0033980 A1 | 2/2005 | Willman et al. |
| 2005/0044534 A1 | 2/2005 | Darweesh et al. |
| 2005/0060722 A1 | 3/2005 | Rochette et al. |
| 2005/0076186 A1 | 4/2005 | Traut |
| 2005/0080936 A1 | 4/2005 | Ray et al. |
| 2005/0091226 A1 | 4/2005 | Lin et al. |
| 2005/0102370 A1 | 5/2005 | Lin et al. |
| 2005/0108171 A1 | 5/2005 | Bajkar et al. |
| 2005/0177635 A1 | 8/2005 | Schmidt et al. |
| 2005/0187894 A1 | 8/2005 | Pletcher et al. |
| 2005/0198379 A1 | 9/2005 | Panasyuk et al. |
| 2005/0203962 A1 | 9/2005 | Zhou et al. |
| 2005/0240985 A1 | 10/2005 | Alkove et al. |
| 2006/0004927 A1 | 1/2006 | Rehman et al. |
| 2006/0005047 A1 | 1/2006 | Lekatsas et al. |
| 2006/0037072 A1 | 2/2006 | Rao et al. |
| 2006/0156418 A1 | 7/2006 | Polozoff |
| 2006/0161563 A1 | 7/2006 | Besbris et al. |
| 2006/0161982 A1 | 7/2006 | Chari et al. |
| 2006/0184931 A1 | 8/2006 | Rochette et al. |
| 2006/0248208 A1 | 11/2006 | Walbeck et al. |
| 2006/0259734 A1 * | 11/2006 | Sheu et al. .................. 711/203 |
| 2006/0294518 A1 | 12/2006 | Richmond et al. |
| 2007/0061556 A1 | 3/2007 | Rothman et al. |
| 2007/0074191 A1 | 3/2007 | Geisinger |
| 2007/0078950 A1 | 4/2007 | Hopkins et al. |
| 2007/0134068 A1 | 6/2007 | Smith et al. |
| 2007/0136579 A1 | 6/2007 | Levy et al. |
| 2007/0136723 A1 | 6/2007 | Smith et al. |
| 2007/0169116 A1 | 7/2007 | Gujarathi et al. |
| 2007/0174910 A1 | 7/2007 | Zachman et al. |
| 2007/0198657 A1 | 8/2007 | Saliba et al. |
| 2007/0244980 A1 | 10/2007 | Baker et al. |
| 2007/0250838 A1 | 10/2007 | Belady et al. |
| 2007/0283324 A1 | 12/2007 | Geisinger |
| 2007/0288228 A1 | 12/2007 | Taiilefer et al. |
| 2008/0005472 A1 | 1/2008 | Khalidi et al. |
| 2008/0005794 A1 | 1/2008 | Inoue et al. |
| 2008/0016339 A1 | 1/2008 | Shukla |
| 2008/0028401 A1 | 1/2008 | Geisinger |
| 2008/0127182 A1 | 5/2008 | Newport et al. |
| 2008/0127225 A1 | 5/2008 | Mullis et al. |
| 2008/0127348 A1 | 5/2008 | Largman et al. |
| 2008/0222160 A1 | 9/2008 | MacDonald et al. |
| 2008/0222628 A1 | 9/2008 | Batra et al. |
| 2008/0263531 A1 | 10/2008 | Perry et al. |
| 2008/0276012 A1 | 11/2008 | Mesa et al. |
| 2009/0024757 A1 | 1/2009 | Proctor |
| 2009/0064196 A1 | 3/2009 | Richardson et al. |
| 2009/0094337 A1 | 4/2009 | Dias |
| 2009/0204960 A1 | 8/2009 | Ben-Yehuda |
| 2009/0204961 A1 | 8/2009 | DeHaan et al. |
| 2009/0210871 A1 | 8/2009 | Dechovich |
| 2009/0217047 A1 | 8/2009 | Akashika et al. |
| 2009/0222304 A1 | 9/2009 | Higgins et al. |
| 2009/0249051 A1 | 10/2009 | TeNgaio et al. |
| 2009/0259993 A1 | 10/2009 | Konduri et al. |
| 2009/0265706 A1 | 10/2009 | Golosovker et al. |
| 2009/0282266 A1 | 11/2009 | Fries et al. |
| 2009/0282404 A1 | 11/2009 | Khandekar et al. |
| 2009/0282474 A1 | 11/2009 | Chen et al. |
| 2009/0307781 A1 | 12/2009 | Iga et al. |
| 2009/0328225 A1 | 12/2009 | Chambers et al. |
| 2010/0017461 A1 | 1/2010 | Kokkevis et al. |
| 2010/0017857 A1 | 1/2010 | Kramer |
| 2010/0023700 A1 | 1/2010 | Chen et al. |
| 2010/0031276 A1 | 2/2010 | Hsieh |
| 2010/0042636 A1 | 2/2010 | Lu |

(56) References Cited

U.S. PATENT DOCUMENTS

| | | |
|---|---|---|
| 2010/0042796 A1 | 2/2010 | Vasilevsky et al. |
| 2010/0042987 A1 | 2/2010 | Yamada |
| 2010/0082926 A1 | 4/2010 | Sahita et al. |
| 2010/0083015 A1 | 4/2010 | Yokota et al. |
| 2010/0115334 A1 | 5/2010 | Malleck et al. |
| 2010/0153659 A1 | 6/2010 | Lovell et al. |
| 2010/0158220 A1 | 6/2010 | Silverman |
| 2010/0169407 A1 | 7/2010 | Hsueh et al. |
| 2010/0169497 A1 | 7/2010 | Klimentiev et al. |
| 2010/0174833 A1 | 7/2010 | Filer et al. |
| 2010/0180275 A1 | 7/2010 | Neogi et al. |
| 2010/0185956 A1 | 7/2010 | Anantharaman et al. |
| 2010/0211663 A1 | 8/2010 | Barboy et al. |
| 2010/0211956 A1 | 8/2010 | Gopisetty et al. |
| 2010/0217853 A1 | 8/2010 | Alexander et al. |
| 2010/0262853 A1 | 10/2010 | Goda |
| 2010/0262977 A1 | 10/2010 | Havemose |
| 2010/0287263 A1 | 11/2010 | Liu et al. |
| 2010/0287548 A1 | 11/2010 | Zhou et al. |
| 2010/0287618 A1 | 11/2010 | Howell et al. |
| 2010/0293392 A1 | 11/2010 | Miyamoto |
| 2010/0306848 A1 | 12/2010 | Gellerich |
| 2010/0332629 A1 | 12/2010 | Cotugno et al. |
| 2011/0004878 A1 | 1/2011 | Divoux |
| 2011/0047376 A1 | 2/2011 | Mital |
| 2011/0119494 A1 | 5/2011 | Huang et al. |
| 2011/0162082 A1 | 6/2011 | Paksoy et al. |
| 2011/0191494 A1 | 8/2011 | Turanyi et al. |
| 2011/0191788 A1 | 8/2011 | Jacobsen et al. |
| 2011/0202739 A1 | 8/2011 | Grisenthwaite |
| 2011/0231670 A1 | 9/2011 | Shevchenko et al. |
| 2011/0246551 A1 | 10/2011 | Giancaspro et al. |
| 2011/0257992 A1 | 10/2011 | Scantland et al. |
| 2011/0264788 A1 | 10/2011 | Costa |
| 2011/0276806 A1 | 11/2011 | Casper et al. |
| 2011/0277013 A1 | 11/2011 | Chinta |
| 2011/0296487 A1 | 12/2011 | Walsh |
| 2011/0302330 A1 | 12/2011 | Cota-Robles et al. |
| 2011/0302415 A1 | 12/2011 | Ahmad et al. |
| 2011/0320520 A1 | 12/2011 | Jain |
| 2011/0320812 A1 | 12/2011 | Kuno et al. |
| 2012/0005192 A1 | 1/2012 | Bao et al. |
| 2012/0017213 A1 | 1/2012 | Hunt et al. |
| 2012/0036255 A1 | 2/2012 | Polsky |
| 2012/0036509 A1 | 2/2012 | Srinivasan et al. |
| 2012/0084562 A1 | 4/2012 | Farina et al. |
| 2012/0144042 A1 | 6/2012 | Lublin et al. |
| 2012/0159184 A1 | 6/2012 | Johnson et al. |
| 2012/0179485 A1 | 7/2012 | Saneii |
| 2012/0203932 A1 | 8/2012 | de Costa et al. |
| 2012/0222025 A1 | 8/2012 | Pandit |
| 2012/0227038 A1 | 9/2012 | Hunt et al. |
| 2012/0227058 A1 | 9/2012 | Hunt et al. |
| 2012/0227061 A1 | 9/2012 | Hunt et al. |
| 2012/0265742 A1 | 10/2012 | Burckhardt et al. |
| 2012/0291094 A9 | 11/2012 | Forrester et al. |
| 2012/0297249 A1 | 11/2012 | Yang et al. |
| 2013/0031371 A1 | 1/2013 | McLellan et al. |
| 2013/0036431 A1 | 2/2013 | Douceur et al. |
| 2013/0054734 A1 | 2/2013 | Bond et al. |
| 2013/0060947 A1 | 3/2013 | Nelson |
| 2013/0151846 A1 | 6/2013 | Baumann |
| 2013/0151848 A1 | 6/2013 | Baumann |
| 2013/0152209 A1 | 6/2013 | Baumann |
| 2013/0232345 A1 | 9/2013 | Johnson et al. |
| 2013/0254884 A1 | 9/2013 | Dalcher et al. |
| 2016/0026488 A1 | 1/2016 | Bond et al. |
| 2016/0196426 A1 | 7/2016 | Hunt et al. |

FOREIGN PATENT DOCUMENTS

| | | |
|---|---|---|
| CN | 101174293 | 5/2008 |
| CN | 101448255 | 6/2009 |
| CN | 101632083 | 1/2010 |
| CN | 101655798 A | 2/2010 |
| CN | 10277209 | 5/2011 |
| EP | 1526425 | 4/2005 |
| EP | 1669901 A2 | 6/2006 |
| EP | 1925120 B1 | 12/2006 |
| JP | 2006164287 | 6/2006 |
| WO | WO2008/111049 | 9/2008 |
| WO | 2011/027191 | 3/2011 |

OTHER PUBLICATIONS

LeVasseur et al. "Pre-Virtualization: Slashing the Cost of Virtualization" †University of Karlsruhe, Germany IBM T. J. Watson Research Center, New York National ICT Australia University of New South Wales, Australia 2005.*

Smith, Roderick W., "Using QEMU for cross-platform development", Retrieved at <<http://www.ibm.com/developerworks/linux/library/l-qemu-development/?ca=drs->>, Feb. 9, 2010, pp. 7.

Mihocka, et al., "Virtualization without direct execution or jitting: designing a portable virtual machine infrastructure", Retrieved at <<http://bochs.sourceforge.net/Virtualization_Without_Hardware_Final.pdf>>, 2008, pp. 16.

"Amazon Elastic Compute Cloud (EC2)" maluke.com, accessible from http://www.maluke.com/blog/amazon-elastic-compute-cloud-ec2, obtained on Dec. 5, 2011, 2 pages.

Ammons, et al., "Libra: A Library OS for a JVM in a Virtualized Execution Environment", In Proceedings of the 3rd International Conference on Virtual Execution Environments, Jun. 13-15, 2007, 11 pages.

Anderson, "The Case for Application-specific Operating Systems", In Proceedings of the 3rd Workshop on Workstation Operating Systems, Apr. 23-24, 1992, 3 pages.

Appavoo, et al., "Providing a Linux API on the Scalable K42 Kernel", In Proceedings of the 2003 USENIX Annual Technical Conference, Jun. 9-14, 2003, 14 pages.

"Aquifer Application Services Platform Version 5.5", retrieved on Mar. 3, 2009 at <<http://www.sysmanagement.com/enterpriseProducts/overview.aspx>>, Systems Management Engineering 2003, 2 pages.

Azab, et al., "SICE: A Hardware-Level Strongly Isolated Computing Environment for x86 Multi-core Platforms", CCS11, Oct. 17-21, 2011, Chicago, Illinois, 14 pages.

Barham, et al., "Xen and the Art of Virtualization", In Proceedings of the 19th ACM Symposium on Operating Systems Principles, Oct. 19-22, 2003, 14 pages.

Baumann et al., The Multikernel: A New OS Architecture for Scalable Multicore Systems:, In Proceedings of the 22nd ACM Symposium on Operating Systems Principles, Oct. 11-14, 2009, 15 pages.

Bershad et al., "Extensibility, Safety and Performance in the Spin Operating System", Proceedings of the fifteenth ACM Symposium on Operating Systems Principles, Published Date: Dec. 3, 1995, 17 pages.

Bhattiprolu, et al., "Virtual Servers and Checkpoint/Restart in Mainstream Linux", SIGOPS Operating Systems Review, Jul. 2008, 10 pages.

"Browser Swallows OS", retrieved on Mar. 3, 2009 at <<http://www.desktoplinus.com/news/NS2750645189.html>>, Ziff Davis Enterprise Holdings, Inc., Dec. 1, 2008, 3 pages.

Bugnion, et al., "Disco: Running Commodity Operating Systems on Scalable Multiprocessors", ACM Transactions on Computer Systems, vol. 15, No. 4, Nov. 1997, 36 pages.

Celesti, et al., "Improving Virtual Machine Migration in Federated Cloud Environments", Second International Conference on Evolving Internet, Published date: Sep. 20-25, 2010, 7 pages.

Chahal, et al., "Testing Live Migration with Intel Virtualization Technology FlexMigration", Intel Information Technology, Jan. 2009, 12 pages.

Chang, et al., "User-level Resource-constrained Sandboxing", USENIX-NT, Aug. 2000, 11 pages.

Chen, et al., "Setuid Demystified", In Proceedings of the 11th USENIX Security Symposium, Aug. 5-9, 2002, 20 pages.

(56) References Cited

OTHER PUBLICATIONS

Chen, "Native Client: A technology for Running Native Code on the Web", retrieved on Mar. 3, 2009 at <<http://google-code-updates.blogspot.com/2008/12/native-client-technology-for-running.html>>, Google Code Blog, Dec. 8, 2008, 21 pages.
Cheriton, et al., "A Caching Model of Operating System Kernel Functionality", In Proceedings of the 1st USENIX Symposium on Operating Systems Design and Implementation, Nov. 1994, 15 pages.
Chernoff, et al., "Digital FX!32 Running 32-Bit x86 Applications on Alpha NT", Proceedings of the USENIX Windows NT Workshop, Seattle, WA., Aug. 1997, 8 pages.
Chiueh, et al., "Integrating Segmentation and Paging Protection for Safe, Efficient and Transparent Software Extensions", retrieved on Mar. 3, 2009 at <<http://www.sigops.org/sosp99/slides/kernel/chiueh.ps>>, Computer Science Dept., State University of New York, NY., 22 pages.
Christodorescu, et al., "Cloud Security is Not (Just) Virtualization Security", CCSW09, Nov. 13, 2009, Chicago, Illinois, 6 pages.
Clark, et al., "Live Migration of Virtual Machines", retrieved on Mar. 3, 2009 at <<http://www.cl.cam.ac.uk/research/srg/netos/papers/2005-migration-nsdi-pre.pdf>>, 14 pages.
"CLOC Count Lines of Code", retrieved on Mar. 3, 2009 at <http://cloc.sourceforge.net/>>, Northrop Grummam Corporation / Information Technology / IT Solutions, 2006-2009, 15 pages.
Cox, et al., "A Safety-Oriented Platform for Web Applications", retrieved on Mar. 3, 2009 at <<http://www.cs.washington.edu/homes/gribble/papers/gribble-Tahoma.pdf>>, 15 pages.
"CVE-2003-0111", retrieved on Mar. 3, 2009 at <<http://cve.mitre.org/cgi-bin/cvename.cgi?name=CAN-2003-0111>>, Common Vulnerabilities and Exposures website, 2009, 1 page.
"CVE-2007-0043", retrieved on Mar. 3, 2009 at <<http://cve.mitre.org/cgi-bin/cvename.cgi?name=CVE-2007-0043>>, Common Vulnerabilities and Exposures website, 2009, 1 page.
"CWE—Common Weakness Enumeration", retrieved on Mar. 3, 2009 at <<http://nvd.nist.gov/cwe.cfm>>, National Vulnerability Database, NIST, 3 pages.
"Debian Counting", retrieved on Mar. 3, 2009 at <<http://libresoft.dat.escet.urjc.es/debian-counting/>>, Grupo de Sistemas y Comunicaciones, Universidad Rey Juan Carlos, Mostoles, Madrid, Spain, 2004-2005, 1 page.
Douceur, et al., "Leveraging Legacy Code to Deploy Desktop Applications on the Web", retrieved on Oct. 11, 2010 at <<http://research.microsoft.com/pubs/72878/xax-osdi08.pdf>>, USENIX Association, Proceedings of Conference on Operating Systems Design and Implementation, San Diego, California, 2008, pp. 339-354.
Eriaku, et al, "Fast Networking with Socket Outsourcing in Hosted Virtual Machine Environments", In Proceedings of the 24th ACM Symposium on Applied Computing, Mar. 8-12, 2009, 8 pages.
Engler, et al., "Exokernel: An Operating System Architecture for Application-level Resource Management", In Proceedings of the 15th ACM Symposium on Operating Systems Principles, Dec. 3-6, 1995, 16 pages.
Erlingsson, et al., "XFI: Software Guards for System Address Spaces", retrieved on Mar. 3, 2009 at <<http://www.cs.ucsd.edu/~mvrable/papers/2006-osdi-xfi.pdf>>, Microsoft Research, Silicon Valley, pp. 1-14.
Ford, et al., "Vx32: Lightweight, User-level Sandboxing on the x86", retrieved at Mar. 3, 2009 at <<http://pdos.csail.mit.edu/papers/vx32:usenix08/>>, Massachusetts Institute of Technology, 20 pages.
Ford, et al., "VXA: A Virtual Architecture for Durable Compressed Archives", retrieved on Mar. 3, 2009 at <<http://pdos.csail.mit.edu/papers/vxa:fast05.pdf>>, Computer Science and Artificial Intelligence Laboratory, MIT, Mass, 14 pages.
Franke, et al., "Fuss, Futexes and Furwocks: Fast Userlevel Locking in Linux", In Proceedings of the Ottawa Linus Symposium, Jul. 11-14, 2010, 19 pages.

Garfinkel, et al., "Flexible OS Support and Applications for Trusted Computing", Proceedings of the 9th conference on Hot Topics in Operating Systems, May 2003, 6 pages.
Garfinkel, et al., "Terra: A Virtual Machine-Based Platform for Trusted Computing", Proceedings of the nineteenth ACM symposium on Operating Systems Principles, Published Date: Oct. 22, 2003, 14 pages.
Garfinkel, "Traps and Pitfalls: Practical Problems in System Call Interposition Based Security Tools", In Proceedings of the Network and Distributed Systems Security Symposium, Feb. 6-7, 2003, 14 pages.
Garfinkel, et al., "Ostia: A Delegating Architecture for Secure System Call Interposition", retrieved on Mar, 3, 2009 at <<http://www.isoc.org/isoc/conferences/ndss/04/proceedings/Papers/Garfinkel.pdf>>, Computer Science Department, Stanford University, CA, 15 pages.
"Gears Improving Your Web Browser", retrieved on Mar. 3, 2009 at <http://gears.google.com/>>, Google 2008, 1 page.
Goldberg, et al., "A Secure Environment for Untrusted Helper Applications (Confining the Wily Hacker)" retrieved on Mar. 3, 2009 at <<http://www.usenix.org/publications/library/proceedings/sec96/full_papers/goldberg/goldberg.pdf>>, Proceedings of the Sixth USENIX UNIX Security Symposium, San Jose, CA., Jul. 1996, 14 pages.
Gupta, et al., "Difference Engine: Harnessing Memory Redundancy in Virtual Machines", In Proceedings of the 8th USENIX Symposium on Operating Systems Design and Implementation, Dec. 8-10, 2008, 14 pages.
Haff, "RingCube brings 'containers' to the client", retrieved on Oct. 11, 2010 at <<http://news.cnet.com/8301-13556_3-10158247-61.html>>, CNET News, Feb. 6 2009, pp. 1-3.
Harren, et al., "Using Dependent Types to Certify the Safety of Assembly Code", retrieved on Mar. 3, 2009 at <<http://www.cs.berkeley.edu/~necula/Papers/deptypes_sas05.pdf>>, Static Analysis Symposium (SAS) 2005, pp. 155-170.
Helander, "Unix Under Mach: The Lites Server", Helsinki University of Technology, Helsinki, Dec. 30, 1994, 71 pages.
Howell, et al., "Living Dangerously: A Survey of Software Download Practices", Microsoft Research, May 2010, 16 pages.
Intel Cloud Builder Guide, "Intel Cloud Builders Guide to Cloud Design and Deployment on Intel Platforms", www.intel.com/en_US/Assets/PDF/general/ibc_ra_cloud_computing_Parallels_TCP.pdf, Retrieved Date: Dec. 7, 2011, 19 pages.
Jackson, et al., "Protecting Browser State from Web Privacy Attacks", retrieved on Mar. 3, 2009 at <<http://portal.acm.org/citation.cfm?id=1135884>>, WWW 2006, May 23-26, 2006, Edinburgh, Scotland, pp. 737-744.
Jobs, S.; "Keynote Address", Apple Worldwide Developers Conference, Aug. 2006, 3 pages.
Kiciman, et al., "AjaxScope: A Platform for Remotely Monitoring the Client-Side Behavior of Web 2.0 Applications", retrieved on Mar. 3, 2009 at <<http://research.microsoft.com/en-us/projects/ajaxview/ajaxscope-sosp.pdf>>, SOSP 2007, Oct. 14-17, 2007, Stevenson, WA., 14 pages.
Ko, et al., "TrustCloud: A Framework for Accountability and Trust in Cloud Computing", Published Jul. 8, 2011, 5 pages.
Kozuch, et al., "Internet Suspend/Resume", retrieved on Mar. 3, 2009 at <<http://www.intel-research.net/Publications/Pittsburgh/110620030912_88.pdf>>, Fourth IEEE Workshop on Mobile Computing Systems and Applications, Callicoon, NY, Jun. 2002, 8 pages.
Leslie, et al, "The Design and Implementation of an Operating System to Support Distributed Multimedia Applications", IEEE Journal on Selected Areas in Communications, May 1996, 18 pages.
Litzkow, et al., "Checkpoint and Migration of UNIX Processes in the Condor Distributed Processing System", University of Wisconsin Madison, Apr. 1997, 9 pages.
"Live from CES: Hands on With Vista—Vista by The Numbers, A Developer Tells All", retrieved on Mar. 3, 2009 at <<http://ces.gearlive.com/cesblog/article/live-from-ces-hands-on-with-vistamdashvista-by-the-numbers-0108051321/>>, 5 pages.

(56) References Cited

OTHER PUBLICATIONS

Livshits, et al., "Doloto: Code Splitting for Network-Bound Web 2.0 Applications", retrieved on Mar. 3, 2009 at <<ftp://ftp.research.microsoft.com/pub/tr/TR-2007-159.pdf>>, Microsoft Research, pp. 1-25.
Lorch, et al., "The VTrace Tool: Building a System Tracer for Windows NT and Windows 2000", retrieved on Mar. 3, 2009 at <<http://msdn.microsoft.com/en-us/magazine/cc302289(printer).aspx>>, Microsoft Corporation 2009, 10 pages.
Loscocco, et al., "Integrating Flexible Support for Security Policies into the Linux Operating System", In Proceedings of the 2001 USENIX Annual Technical Conference, Feb. 2001, 62 pages.
Love, "Get on the D-Bus", Linux Journal, accesible from http://www.ee.ryerson.ca/~courses/coe518/LinuxJournal/elj2005-130-D-BUS.pdf, obtained on Jun. 18, 2006, 5 pages.
Malan, et al., "DOS as a Mach 3.0 Application", In Proceedings of the USENIX Mach Symposium, Nov. 1991, 14 pages.
Marosi et al., "Using VirtualMachines in Desktop Grid Clients for Application Sandboxing", CoreGRID Technical Report, No. TR-140, Aug. 31, 2008, 13 pages.
McCamant, et al., "Evaluating SFI for a CISC Architecture", retrieved on Mar. 3, 2009 at <<http://groups.csail.mit.edu/pag/pubs/pittsfield-usenix2006.pdf>>, pp. 1-16.
McIlroy, "Mass Produced Software Components", retrieved on Mar. 3, 2009 at <<http://www.dcs.gla.ac.uk/courses/teaching/mscweb/rrcs/papers/SE/McIlroy.pdf , 12 pages.
Microsoft, "Microsoft Application Virtualization (App-V)", accessible from http://www.microsoft.com/en-us/windows/enterprise/products-and-technologies/virtualization/app-v.aspx, obtained on Dec. 7, 2011, 2 pages.
Microsoft, "Performance Tuning Guidelines for Windows Server 2008 R2", Redmond, WA, May 16, 2011, 118 pages.
Microsoft, "Remote Desktop Protocol: Basic Connectivity and Graphics Remoting Specification", Redmond, WA, release: Sep. 20, 2011, 417 pages.
Microsoft—TechNet, Device Management and Installation Step-by-Step Guide, retrieved on Apr. 14, 2011 at http://technet.microsoft.com/en-us/library/dd919230%28WS.10%29.aspx, 2 pages.
Morrisett, et al., "From System F to Typed Assembly Language", retrieved on Mar. 3, 2009 at <<http://www.cs.princeton.edu/~dpw/papers/tal-toplas.pdf>>, Mar. 1999, pp. 1-41.
"Mozilla: The browser as operating system", retrieved on Mar. 3, 2009 at <<http://www.mathewingram.com/work/2008/08/26/mozilla-the-browser-as-operating-system>>, Aug. 26, 2008, 8 pages.
Necula, et al., "CCured: Type-Safe Retrofitting of Legacy Software", retrieved on Mar. 3, 2009 at <<http://www.eecs.berkeley.edu/~necula/Papers/ccured_toplas.pdf>>, ACM Transactions on Programming Languages and Systems, vol. 27, No. 3, May 2005, 48 pages.
Necula, et al., "Safe Kernel Extensions Without Run-Time Checking", retrieved on Mar. 3, 2009 at <<http://citeseerx.ist.psu.edu/viewdoc/summary?doi=10.1.1.40.3010>>, Proceedings of the Second Symposium on Operating Systems Design and Implementation (OSDI 1996), Seattle, WA., Oct. 28-31, 1996, 15 pages.
Office action for U.S. Appl. No. 12/463,892, mailed on Jun. 14, 2012, Howell et al., "Executing Native-Code Applications in a Browser", 15 pages.
Office Action for U.S. Appl. No. 12/463,892, mailed on Dec. 6, 2011, Jonathan R. Howell, "Executing Native-Code Applications in a Browser", 21 pgs.
"Open Source Software", retrieved on Mar. 3, 2009 at <<http://sourceforge.net>>, SourceForge, Inc., 1999-2009, 1 page.
OSdata.com, "Maintenance and Administration," retrieved on Apr. 14, 2011 at <<http://www.osdata.com/holistic/maintain/maintain.htm>>, 8 pages.
"Outsource Web Enabling your Legacy Applications to O2I", retrieved on Mar. 3, 2009 at <<http://www.outsource2india.com/software/LegacySystems.asp>>, Flatworld Solutions Company, 2008, 7 pages.
Piotrowski, et al., "Virtics: A System for Privilege Separation of Legacy Desktop Applications", retrieved on Oct. 11, 2010 at <<http://www.eecs.berkeley.edu/Pubs/TechRpts/2010/EECS-2010-70.pdf>>, EECS Department, University of California at Berkeley, Technical Report No. UCB/EECS-2010-70, May 13, 2010, pp. 1-21.
Porter et al., "Rethinking the Library OS from the Top Down", ASPLOS' 11, Mar. 5-11, 2011, Newport Beach, California, 15 pages.
Provos, "Improving Host Security with System Call Policies", retrieved on Mar. 3, 2009 at <<http://www.citi.umich.edu/u/provos/papers/systrace.pdf>>, Center for Information Technology Integration, University of Michigan, 15 pages.
Puder, "Extending Desktop Applications to the Web", retrieved on Mar. 3, 2009 at <<http://www.puder.org/publications/dorea04.pdf>>, San Francisco State University, Computer Science Department, 6 pages.
Purdy, et al., "Google Chrome as Future Operating System", retrieved on Mar. 3, 2009 at <<http://lifehacker.com/5053069/google-chrome-as-future-operating-system>>, Sep. 22, 2008, 1 page.
Resig, "The Browser Operating System", retrieved on Mar. 3, 2009 at <<http://ejohn.org/blog/the-browser-operating-system/>>, Feb. 22, 2009, 5 pages.
Rinard, et al., "Enhancing Server Availability and Security Through Failure-Oblivious Computing", retrieved on Mar. 3, 2009 at <<http://web.mit.edu/droy/www/papers/osdi04.pdf>>, Computer Science and Artificial Intelligence Laboratory, MIT, Mass., 14 pages.
Roscoe, et al., "Hype and Virtue", In Proceedings of the 11th USENIX Workshop on Hot Topics in Operating Systems, Aug. 2007, 6 pages.
Sabin, "Strace for NT", retrieved on Mar. 3, 2009 at <<http://www.securityfocus.com/tools/1276>>, SecurityFocus 2007, 1 page.
Sapuntzakis, et al., "Optimizing the Migration of Virtual Computers", retrieved on Mar. 3, 2009 at <<http://suif.stanford.edu/collective/osdi02-optimize-migrate-computer.pdf>>, Computer Science Department, Stanford University, 14 pages.
Sapuntzakis et al., "Virtual Appliances for Deploying and Maintaining Software", Proceedings of the Large Installation Systems Administration Conference, Oct. 2003, 15 pages.
"Secunia Advisories: SA7587", retrieved on Mar. 3, 2009 at <<http://secunia.com/advisories/7587/>>, Secunia 2002-2009, 4 pages.
Soltesz, et al., "Container-based Operating System Virtualization: A Scalable, High-performance Alternative to Hypervisors", Proceedings of the 2nd ACM SIGOPS/EuroSys European Conference on Computer Systems, Mar. 21-23, 2007, 13 pages.
Spear, et al., "Solving the Starting Problem: Device Drivers as Self-describing Artifacts", In Proceedings of the EuroSys 2006 Conference, Apr. 18-21, 2006, 13 pages.
Stokely, "The FreeBSD Handbook", 3rd Edition, vol. 1: User's Guide, FreeBSD Mall, Inc., Brentwood, CA., 2003, 408 pgs.
Sugerman, et al., "Virtualizing I/O Devices on VMware Workstations Hosted Virtual Machine Monitor", In Proceedings of the 2001 USENIX Annual Technical Conference, Jun. 25-30, 2001, 15 pages.
"Sun Ray Ultra-Thin Clients in Technical Computing", retrieved on Oct. 11, 2010 at <<http://www.sun-rays.org/lib/hardware/sunray/ds/sunray_tc.pdf>>, Sun Microsystems, Inc., Datasheet, 2003, pp. 1-2.
Swift, et al., "Improving the Reliability of Commodity Operating Systems", retrieved on Mar. 3, 2009 at <<http://nooks.cs.washington.edu/nooks-tocs.pdf>>, University of Washington, pp. 1-33.
Szefer, et al., "A Case for Hardware Protection of Guest VMs from Compromised Hypervisors in Cloud Computing", Proceedings of the Second International Workshop on Security and Privacy in Cloud Computing (SPCC 2011), Jun. 2011, 5 pages.
Szefer, et al., "Eliminating the Hypervisor Attack Surface for a More Secure Cloud", published Oct. 17-21, 2011, CCS11, 12 pages.

(56) References Cited

OTHER PUBLICATIONS

Ta-Min, et al., "Splitting Interfaces: Making Trust between Applications and Operating Systems Configurable", Proceedings of the 7th symposium on Operating systems design and implementation, Published Date: Nov. 2006, 14 pages.
Tan, et al.; "iKernel: Isolating Buggy and Malicious Device Drivers Using Hardware Virtualization Support"; Proceedings of the Third IEEE International Symposium on Depenable, Autonomic and Secure Computing; 2007; pp. 134-144.
"The Dojo Offline Toolkit", retrieved on Mar. 3, 2009 at <<http://dojotoolkit.org/offline>>, The Dojo Foundation, 3 pages.
Tridgell, "Efficient Algorithms for Sorting and Synchronization", retrieved on Mar. 3, 2009 at <<http://www.samba.org/~tridge/phd_thesis.pdf>>, Australian National University, Feb. 1999, 115 pages.
Tucker, et al., "Solaris Zones: Operating System Support for Server Consolidation", retrieved on Mar. 3, 2009 at <<http://www.usenix.org/events/vm04/wips/tucker.pdf>>, Sun Microsystems, Inc., 2 pages.
"User-Mode Driver Framework (UMDF)", Microsoft Windows, retrieved on Aug. 4, 2011 at <<http://msdn.microsoft.com/en-us/windows/hardware/gg463294.aspx>>, 1 page.
VMWare ThinApp, "Application Virtualization Made Simple", accessible from http://www.vmware.com/products/thinapp/overview.html, data sheet obtained on Aug. 29, 2012, 2 pages.
Wahbe, et al., "Efficient Software-Based Fault Isolation", retrieved on Mar. 3, 2009 at <<http://crypto.stanford.edu/cs155/papers/sfi.pdf>>, SIGOPS 1993/12/93/N.C., USA, pp. 203-216.
Waldspurger, "Memory Resource Management in VMware ESX Server", Proc. Fifth Symposium on Operating Systems Design and Implementation (OSDI 2002), Dec. 2002, pp. 1-14.
"What is JPC?", retrieved on Mar. 3, 2009 at <<http://www-jpc.physics.ox.ac.uk/>>, Oxford University, 2004-2007, 2 pages.
Whitaker, et al., "Danali: Lightweight Virtual Machines for Distributed and Networked Applications", retrieved on Mar. 3, 2009 at <<http://denali.cs.washington.edu/pubs/distpubs/papers/denali_usenix2002.pdf>>, University of Washington, 14 pages.
Whitaker, et al., "Scale and Performance in the Denali Isolation Kernel", In Proceedings of the 5th USENIX Symposium on Operating Systems Design and Implementation, Dec. 9-11, 2002, 15 pages.
"Windows Driver Kit", retrieved on Mar. 3, 2009 at http://microsoft.com/whdc/devtools/wdk/default.mspx, Microsoft Corporation 2009, 2 pages.
"Windows User Mode Driver Framework", From Wikipedia, the free encyclopedia, Retrieved on Aug. 4, 2011 at <<http://en.wikipedia.org/wiki/User-Mode_Driver_Framework>>, 2 pages.
"WineHQ", retrieved on Mar. 3, 2009 at <<http://www.winehq.org/>>, 3 pages.
Witchel, et al., "Mondrix: Memory Isolation for Linux using Mondriaan Memory Protection", retrieved on Mar. 3, 2009 at <<http://www.cag.lcs.mit.edu/scale/papers/mmp-sosp2005.pdf>>, SOSP 2005, Oct. 23-26, 2005, Brighton, UK, 14 pages.
Wood, et al., "CloudNet: Dynamic Pooling of Cloud Resources by Live WAN Migration of Virtual Machines", VEE'11, Mar. 9-11, 2011, Newport Beach, California, 12 pages.
Yee, et al., "Native Client: A Sandbox for Portable, Untrusted x86 Native Code", in Proceedings of the 30$^{th}$ IEEE Symposium on Security and Privacy, May 17-20, 2009, 15 pages.
Zeldovich, et al., "Making Information Flow Explicit in Histar", In Proceedings of the 8th USENIX Symposium on Operating Systems Design and Implementation, Nov. 2006, 16 pages.
Zhang, et al., "A CORBA Trader-based Dynamic Binding Infrastructure in Pervasive Computing", International Symposium on Pervasive Computing and Applications, 2006, pp. 12-16.
Microsoft Corporation, "Internet Information Services 7.5", Retrieved at: <<http://technet.microsoft.com/en-us/library/dd364124(WS.10).aspx>>, Mar. 24, 2009, pp. 4.
Microsoft Computer Dictionary, Fifth Edition, Microsoft Press, A Division of Microsoft Corporation, One Microsoft Way Redmond, WA, 98052-6399, Copyright 2002 by Microsoft Corporation.

Allen, Jennifer, "Windows Vista Application Development Requirements for User Account Control Compatability", Retrieved From: <<http://msdn.microsoft.com/en-us/library/bb530410.aspx>>, Jun. 2007.
Bagchi, Susmit, "On Reliable Distributed IPC/RPC Design for Interactive Mobile Applications", 2010 ACM 978-1-4503-0047, Jun. 10, 2010, pp. 33-38.
Charles, "Mark Russinovich: Inside Windows 7" Retrieved at: <<http://channel9.msdn.com/show/going+deep/Mark-Russinovich-Inside-Windows-7>>, Jan. 14, 2009.
Gregg et al., "Overview of IBM zEnterprise 196 I/O Subsystem with Focus on New PCI Express Infrastructure", IBM, Journal of Research and Development, vol. 56, No. 1 and 2 Paper 8, Jan./Mar. 2012, pp. 8:1-8:14.
Kobayashi, et al., "Quick Reboot-Based Recovery for Commodity Operating Systems in Virtualized Server Consolidation", Retrieved Date: Sep. 15, 2011, pp. 6.
Parno et al., "Memoir: Practical State Continuity for Protected Modules", In Proceedings of the IEEE Symposium on Security and Privacy, IEEE, May 2011.
Wang et al., "Protection and Communication Abstractions for Web Browsers in MashupOS", SOS 2007, 15 pages.
Yu et al., "A Feather-Weight Virtual Machine for Windows Applications", VEE'06, 2006, 11 pages.
Zhou et al., "Flexible On-Device Service Object Replication with Replets", Proceedings of the 13th International Conference on World Wide Web. ACM, 2004.
"International Search Report", Mailed Date: Oct. 30, 2012, Application No. PCT/US2012/027635, Filed Date: Mar. 3, 2012, pp. 9.
Verizon Wireless, "Escaping from Microsoft's Protected Mode Internet Explorer—Evaluating a Potential Security Boundary", White Paper, Nov. 10, 2011.
Office Action for U.S. Appl. No. 13/196,235, Mailed on Jul. 3, 2014, Douceur, et al.
Response to Office Action for U.S. Appl. No. 13/196,235 Mailed on Apr. 9, 2014, filed Jun. 12, 2014, Douceur et al.
Office Action for U.S. Appl. No. 12/972,081, Mailed on Apr. 5, 2013, Douceur et al.
Office Action for U.S. Appl. No. 12/972,081, Mailed on Sep. 10, 2013, Douceur, et al., 18 pages.
Office Action for U.S. Appl. No. 12/972,081, Mailed on Apr. 17, 2014, Douceur, et al., 27 pages.
Office Action for U.S. Appl. No. 13/196,235 Mailed on Apr. 8, 2013, Douceur et al.
Office Action for U.S. Appl. No. 13/196,235 Mailed on Apr. 9, 2014, Douceur et al., 34 pages.
Office Action for U.S. Appl. No. 13/196,235, Mailed on Oct. 15, 2013, Douceur, et al., 29 pages.
Response to Office Action for U.S. Appl. No. 13/196,235, Mailed on Oct. 15, 2013, filed Mar. 17, 2014, Douceur, et al.
Response to Office Action for U.S. Appl. No. 12/972,081, Mailed on Sep. 10, 2013, filed Jan. 10, 2014, Douceur, et al.
Office Action for U.S. Appl. No. 13/345,031 Mailed on Nov. 6, 2013, Hunt, et al., 8 pages.
Response to Office Action for U.S. Appl. No. 12/972,081, Mailed on Apr. 5, 2013, filed Aug. 5, 2013, Douceur et al.
Office Action for U.S. Appl. No. 13/314,512 Mailed on Jul. 30, 2013, Hunt, et al., 19 pages.
Response to Office Action for U.S. Appl. No. 13/196,235 Mailed on Apr. 8, 2013, filed Jul. 8, 2013, Douceur et al.
Response to Office Action for U.S. Appl. No. 12/972,081, Mailed on Apr. 17, 2014, filed Douceur, et al.
"International Search Report and Written Opinion" for PCT Application No. PCT/US2012/067660, Mailed Date: Mar. 20, 2013.
"International Search Report and Written Opinion" for PCT Application No. PCT/US2012/067662, Mailed Date: Mar. 11, 2013.
Response to Office Action for U.S. Appl. No. 13/314,512 Mailed on Jul. 30, 2013, filed May 4, 2014, Hunt, et al.
Notice of Allowance, Mailed on Feb. 11, 2015 for U.S. Appl. No. 12/834,895, 8 pages.
First Office Action, From Chinese Patent Application No. 201210533610.9, Filed: Dec. 11, 2012, Mailed: Dec. 3, 2014.

(56) References Cited

OTHER PUBLICATIONS

First Office Action, From Chinese Patent Application No. 201210537282.X, Filed: Dec. 12, 2012, Mailed: Jan. 28, 2015.
Tucker, et al., "Solaris Zones: Operating System Support for Server Consolidation," retrieved on Mar. 3, 2009 at: <<http://www.usenix.org/events/vm04/wips/tucker.pdf, Sun Microsystems, Inc., 2 pages.
Vaughan-Nichols, Steven J., "New Approach to Virtualization is a Lightweight," IEEE, Computer, vol. 39, Issue 11, Nov. 2006, pp. 12-14.
Condit et al., "Beta-Diversity in Tropical Forest Trees,", Science vol. 295, pp. 666-669, 2002.
Fischer, Donald, "Red Hat Enterprise Linux 4 Application Compatibility", Feb. 2005, pp. 1-12.
Keetch, T., Escaping from Protected Mode Internet Explorer—Evaluating a potential security boundary. Verizon Business, London, UK, 2010.
Non-Final Office Action, From U.S. Appl. No. 13/323,465, filed Dec. 21, 2011, Mailed: Sep. 13, 2013.
Response to the Sep. 13, 2013 Non-Final Office Action, From U.S. Appl. No. 13/323,465, filed Dec. 30, 2013.
Applicant Initiated Interview Summary, From U.S. Appl. No. 13/323,465, Mailed: Oct. 29, 2013.
Final Office Action, From U.S. Appl. No. 13/323,465, filed Mar. 12, 2014.
Response to the Mar. 12, 2014 Final Office Action, From U.S. Appl. No. 13/323,465, filed: Jun. 12, 2014.
Non-Final Office Action, From U.S. Appl. No. 12/834,895, filed Jul. 13, 2010, Mailed: Nov. 6, 2012.
Response to the Nov. 6, 2012 Non-Final Office Action, From U.S. Appl. No. 12/834,895, filed: Mar. 6, 2013.
Applicant Initiated Interview Summary, From U.S. Appl. No. 12/834,895, filed: Mar. 22, 2013.
Final Office Action, From U.S. Appl. No. 12/834,895, Mailed: Apr. 30, 2013.
Response to the Apr. 30, 2013 Final Office Action, From U.S. Appl. No. 12/834,895, filed Aug. 20, 2013.
Restriction Requirement, From U.S. Appl. No 12/463,892, filed May 11, 2009, Mailed: Sep. 29, 2011.
Response to the Restriction Requirement, From U.S. Appl. No. 12/463,892, Filed: Oct. 31, 2011.
Non-Final Office Action, From U.S. Appl. No. 12/463,892, Mailed: Dec. 6, 2011.
Response to the Dec. 6, 2011 Non-Final Office Action, From U.S. Appl. No. 12/463,892, filed May 7, 2012.
Final Office Action, From U.S. Appl. No. 12/463,892, Mailed: Jun. 14, 2012.
Notice of Appeal, From U.S. Appl. No. 12/463,892, filed Nov. 14, 2012.
Appeal Brief, From U.S. Appl. No. 12/463,892, filed Jan. 14, 2013.
Examiner's Answer to Appeal Brief, From U.S. Appl. No. 12/463,892, Mailed: Feb. 19, 2013.
Reply Brief, From U.S. Appl. No. 12/463,892, filed Apr. 19, 2013, 2013.
Response to the Jul. 30, 2013 Non-Final Office Action, From U.S. Appl. No. 13/314,512, filed: Apr. 2, 2014.
Final Office Action, From U.S. Appl. No. 13/314,512, Mailed: Jul. 15, 2014.
Non-Final Office Action, From U.S. Appl. No. 13/323,562, filed, Mailed: May 8, 2013.
Response to the May 8, 2013 Non-Final Office Action, From U.S. Appl. No. 13/323,562, filed Aug. 21, 2013.
Non-Final Office Action, From U.S. Appl. No. 13/323,562, Mailed: Oct. 23, 2013.
Response to the Oct. 23, 2013 Non-Final Office Action, From U.S. Appl. No. 13/323,562, filed Jan. 23, 2014.
Supplementary European Search Report, From European Patent Application No. 12858587.4, Filed: Dec. 4, 2012, Mailed: Sep. 9, 2014.
Office Action, From European Patent Application No. 12858587.4, Mailed: Oct. 21, 2014.

Extended European Search Report, From European Patent Application No. 12752531.9, Filed: Dec. 4, 2012, Mailed: Oct. 27, 2014.
Communication Pursuant to Rules 70(2) and 70a(2) EPC, From European Patent Application No. 12752531.9, Mailed: Nov. 13, 2014.
Response filed Jul. 2, 2015 to the Office Action mailed May 27, 2015 from European Patent Application No. 12858489.3, 11 pages.
Final Office Action mailed Jul. 22, 2015 from U.S. Appl. No. 13/323,465, 29 pages.
Final Office Action mailed Jul. 22, 2015 from U.S. Appl. No. 13/372,390, 24 pages.
NPL Search Results from U.S. Appl. No. 13/196,235, Elsevier Eng. Info. Inc., 2013, 23 pages.
Farsi, M., "CANOpen Communication", Proceedings of Drives and Controls, Mar. 5-7, 1996, 1 Page. INSPEC Abstract Retrieved on-line from Dialog.
Hac, A., "Network Time Slots Allocation by Using a Time Multiplexed Switch in a Telecommunications Architecture", Singapore ICCS '94, Nov. 14-18, 1994, pp. 1149-1153, 5 Pages.
Hwang et al., "ATM-Based Plug-and-Play Technique for In-home Networking", Electronic Letters, Oct. 29, 1988, vol. 34, No. 22, pp. 2088-2090, 3 Pages.
Mallipeddi et al., "Ensemble Strategies in Compact Differential Evolution", 2011 IEEE Congress of Evolutionary Computation, CEC 2011, Jun. 5-6, 2011, pp. 1972-1977, 6 Pages.
Portoles et al., "IEEE 802.11 Downlink Traffic Shaping Scheme for Multi-User Service Enhancement", 14th IEEE 2003 International Symposium on Personal, Indoor and Mobile Radio Communications, PIMRC2003, Sep. 9-10, 2003, pp. 1712-1716, 5 Pages.
Quinn et al., "Neutron Sensitivity of High-Speed Networks", IEEE Transactions on Nuclear Science, vol. 57, No. 6, Dec. 2010, pp. 3547-3552, 6 Pages.
Tanaka, H., "Run-time Updating of Network Device Drivers", NBiS 2009—12th International Conference on Network-Based Information Systems, Aug. 19-21, 2009, pp. 446-450, 5 Pages.
Final Office Action mailed Jul. 16, 2015 from U.S. Appl. No. 13/331,078, 10 pages.
Non-Final Office Action mailed Mar. 12, 2013 from U.S. Appl. No. 13/372,390, 17 Pages.
Response filed May 30, 2013 to Non-Final Office Action mailed Mar. 12, 2013 from U.S. Appl. No. 13/372,390, 19 Pages.
Final Office Action mailed Sep. 19, 2013 from U.S. Appl. No. 13/372,390, 20 pages.
Response filed Jan. 21, 2014 to the Final Office Action mailed Sep. 19, 2013 from U.S. Appl. No. 13/372,390, 15 pages.
Non-Final Office Action mailed Dec. 19, 2014 from U.S. Appl. No. 13/372,390, 45 pages.
Response filed Jun. 18, 2015 to Non-Final Office Action mailed Dec. 19, 2014 from U.S. Appl. No. 13/372,390, 36 pages.
Non-Final Office Action mailed Feb. 28, 2014 from U.S. Appl. No. 13/215,244, 15 Pages.
Response filed May 28, 2014 to the Non-Final Office Action mailed Feb. 28, 2014 from U.S. Appl. No. 13/215,244, 12 Pages.
Final Office Action mailed Sep. 26, 2014 from U.S. Appl. No. 13/215,244, 18 Pages.
Response filed Nov. 26, 2014 to the Final Office Action mailed Sep. 26, 2014 from U.S. Appl. No. 13/215,244, 14 Pages.
Advisory Action mailed Dec. 12, 2014 from U.S. Appl. No. 13/215,244, 8 Pages.
Non-Final Office Action mailed Feb. 23, 2015 from U.S. Appl. No. 13/215,244, 22 Pages.
Response filed Jun. 20, 2015 to Office Action mailed Feb. 23, 2015 from U.S. Appl. No. 13/215,244. 15 Pages.
Response filed May 4, 2014 to Non-Final Office Action mailed Nov. 6, 2013 from U.S. Appl. No. 13/345,031, 8 Pages.
Notice of Allowance mailed Jul. 8, 2014 from U.S. Appl. No. 13/345,031, 5 Pages.
Applicant-Initiated Interview Summary mailed Feb. 9, 2012 from U.S. Appl. No. 12/463,892, 3 Pages.
Amendment/Response filed May 7, 2012 to Non-Final Office Action mailed Dec. 6, 2011 from U.S. Appl. No. 12/463,892, 19 Pages.
Preliminary Amendment filed Feb. 13, 2012 from U.S. Appl. No. 13/323,562, 3 pages.

(56) References Cited

OTHER PUBLICATIONS

Notice of Allowance mailed on May 9, 2014 from U.S. Appl. No. 13/323,562, 14 Pages.
Notice of Allowance mailed Feb. 11, 2015 from U.S. Appl. No. 13/313,562, 22 Pages.
Office Action mailed May 27, 2015 from European Patent Application No. 12858489.3, 5 Pages.
Non-Final Office Action mailed Dec. 22, 2014 from U.S. Appl. No. 13/331,078, 15 Pages.
Response filed May 22, 2015 to the Non-Final Office Action mailed Dec. 22, 2014, from U.S. Appl. No. 13/331,078, 9 Pages.
Response filed Apr. 2, 2014 to the Non-Final Office Action mailed Jul. 30, 2013 from U.S. Appl. No. 13/314,512, 10 Pages.
Response filed Jan. 15, 2015 to the Final Office Action mailed Jul. 15, 2014 from U.S. Appl. No. 13/314,512, 12 Pages.
Office Action mailed Jun. 25, 2015 from U.S. Appl. No. 13/314,512. 13 pages.
Response filed May 15, 2015 to Office Action mailed Nov. 13, 2014, from European Patent Application No. 12752531.9, 18 Pages.
Preliminary Amendment filed Feb. 13, 2012 from U.S. Appl. No. 13/323,465, 3 pages.
Office Action mailed Mar. 26, 2015 from U.S. Appl. No. 13/323,465, 28 pages.
Response mailed Jun. 16, 2015 to Office Action mailed Mar. 26, 2015 from U.S. Appl. No. 13/323,465, 17 pages.
Response filed Feb. 23, 2015 to the Office Action mailed Oct. 21, 2014 from European Patent Application No. 12858587.4, 13 Pages.
Response filed Aug. 14, 2013 to the Final Office Action dated Apr. 30, 2013 from U.S. Appl. No. 12/834,895, 12 Pages.
Notice of Allowance mailed on May 21, 2014 for U.S. Appl. No. 12/834,895, 17 Pages.
Supplemental Amendment filed Aug. 20, 2014 to the Notice of Allowance mailed May 21, 2014 from U.S. Appl. No. 12/834,895, 8 Pages.
Notice of Allowance for U.S. Appl. No. 12/834,895 mailed on Feb. 11, 2015, 8 pages.
Notice of Allowance for U.S. Appl. No. 12/834,895 mailed on Jun. 1, 2015, 7 pages.
Sahita et al., "Beyond Ring-3: Fine Grained Application Sandboxing", W3C Workshop on Security for Access to Device APIs from the Web, Dec. 10-11, 2008, 5 Pages.
Examiner Interview Summary mailed Jun. 25, 2015 from U.S. Appl. No. 13/314,512, 1 pages.
Response filed Aug. 13, 2015 to Office Action mailed Jan. 28, 2015 from Chinese Patent Application No. 201210537282.X, 9 pages.
Second Office Action mailed Aug. 21, 2015 from Chinese Patent Application No. 201210533610.9, 10 pages.
Supplementary European Search Report mailed May 7, 2015 from European Patent Application No. 12858489.3, 3 pages.
"Safenet Hardware Security Modules (HSMs)", retrieved on Oct. 31, 2013, at <<http://www.safenet-inc.com/products/data-protection/hardware-security-modules-hsms/>>, 9 pages.
"Thoughts on Intel's Upcoming Software Guard Extensions (Part 2)", published on Sep. 23, 2013, retrieved at <<http://sec.soup.io/post/348921006/Thoughts-on-Intels-upcoming-Software-Guard-Extensions, 10 pages.
"What is Apple's New Secure Enclave and Why is it Important?", published on Sep. 18, 2013, retrieved at <<http://www.forbes.com/sites/quora/2013/09118/what-is-apples-new-secure-enclave-and-why-is-it-important/2/>>, 5 pages.
AWS CloudHSM, retrieved on Oct. 28, 2013, at <<http://aws.amazon.com/cloudhsm/>>, 5 pages.
Chiueh et al., "Integrating Segmentation and Paging Protection for Safe, Efficient and Transparent Software Extensions", Proceedings of 17th ACM Symposium on Operating Systems Principles (SOPS '99), published as Operating Systems Review, vol. 34, No. 5, Dec. 1999, pp. 140-153, 14 pages.
Sun Bytecode Verifier Vulnerability, Sun Security Bulletin #00218, The U.S. Department of Energy Computer Incident Advisory Center Information Bulletin No. M-060, Mar. 19, 2002, 5 pages.
Cox et al., "A Safety-Oriented Platform for Web Applications", Proceedings of Symposium on Security and Privacy, 2006, pp. 350-364, 15 pages.
Douceur et al., "Leveraging Legacy Code to Deploy Desktop Applications on the Web", retrieved on Oct. 16, 2015 at <<http://usenix.org/legacy/event/osdi08/tech/full_papers/douceur/douceur_html/index.html, 23 pages.
Erlingsson et al., "XFI: Software Guards for System Address Spaces", Proceedings of the 7th USENIX Symposium on Operating Systems Design and Implementation (OSDI '06), pp. 75-88, 14 pages.
Ford & Cox, "Vx32: Lightweight, User-level Sandboxing on the x86", Proceedings of the USENIX Annual Technical Conference, 2008, pp. 293-306, 14 pages.
Ford, Bryan, "VXA: A Virtual Architecture for Durable Compressed Archives", Proceedings of 4th USENIX Conference on File and Storage Technologies (FAST'05), 2005, vol. 4, pp. 295-308, 14 pages.
Franke et al., "Fuss, Futexes and Furwocks: Fast Userlevel Locking in Linux", Proceedings of the Ottawa Linux Symposium, Jun. 26-29, 2002, Ottawa, Ontario, Canada, pp. 479-495, 19 pages.
Karmel, Anil, "Building YOURcloud: The Federal Government's first Secure Hybrid Community Cloud", retrieved on Oct. 30, 2013, at <<http://govmarkcouncil.com/presentations/event112912/Anil_Karmel.pdf>>, RightPath, 39 pages.
Karthik & Krishna, "A Secure Access Code Technique for Remote Data Integrity on Public Cloud", International Journal of Computer Applications, vol. 77, No. 14, Sep. 2013, pp. 26-31, 6 pages.
Keetch, T., "Escaping from Protected Mode Internet Explorer," Verizon Business, retrieved at <<https://www.google.com/webhp?sourceid=chrome-instant&ion=1&espv=2&ie=UTF-8#q=keetch+escaping+from+protected+mode+internet+explorer+>>, 47 pages.
Levasseur et al., "Pre-Virtualization: Slashing the Cost of Virtualization," Technical Report 2005-30, Nov. 2005, 14 pages.
Lorch, Jacob R. and Smith, Alan Jay, "Building VTrace, a Tracer for Windows NT and Windows 2000," University of California, Berkeley, Computer Science Division (EECS), Report No. UCB/CSD-00-1093, Feb. 2000, 18 pages.
Masti et al., "An Architecture for Concurrent Execution of Secure Environments in Clouds", Proceedings of the ACM Cloud Computing Security Workshop, CCSW'13, Nov. 8, 2013, Berlin, Germany, 12 pages.
McKeen et al., "Innovative Instructions and Software Model for Isolated Execution", Proceedings of the 2nd International Workshop on Hardware and Architectural Support for Security and Privacy, Jun. 24, 2013, 8 pages.
Morrisett et al., "From System F to Typed Assembly Language", Symposium on Principles of Programming Languages (POPL), 1998, pp. 85-97, 13 pages.
Price & Tucker, "Solaris Zones: Operating System Support for Consolidating Commercial Workloads," Proceedings of the Large Installation Systems Administration Conference (LISA), Sun Microsystems, Nov. 14-19, 2004, vol. 4, pp. 243-256, 14 pages.
Provos, Niels, "Improving Host Security with System Call Policies", Proceedings of the 12th Conference on USENIX Security Symposium, (SSYM), 2003, 15 pages.
Rinard et al., "Enhancing Server Availability and Security Through Failure-Oblivious Computing", Proceedings of Operating Systems Design and Implementation (OSDI), 2004, pp. 303-316, 14 pages.
Sapuntzakis et al., "Optimizing the Migration of Virtual Computers", Proceedings of the 5th Symposium on Operating Systems Design and Implementation (OSDI), USENIX Association, Boston, MA, Dec. 9-11, 2002, pp. 377-390, 15 pages.
Sedayao, Jeff, "Enhancing Cloud Security Using Data Anonymization," White Paper of Intel, Jun. 2012, 8 pages.
Swift et al., "Improving the Reliability of Commodity Operating Systems", Proceedings of Symposium on Operating Systems Principles (SOSP), Oct. 19-22, 2003, pp. 207-222, 16 pages.
Verizon Wireless, "Escaping from Microsoft's Protected Mode Internet Explorer—Evaluating a Potential Security Boundary", White Paper, 2010, 8 pages.

(56) References Cited

OTHER PUBLICATIONS

Whitaker et al., "Denali Lightweight Virtual Machines and Networked Applications," In Proceedings of the USENIX Annual Technical Conference, Dec. 17, 2002, 14 pages.
Response filed May 15, 2015 to Office Action from Nov. 13, 2014 from European Patent Application No. 12752531.9, 18 pages.
Final Office Action mailed Oct. 1, 2015 from U.S. Appl. No. 13/215,244, 20 pages.
Supplementary Search Report mailed Oct. 27, 2014 from European Patent Application No. 12752531.9, 9 pages
Request for Examination and Voluntary Amendment filed Jan. 30, 2015 from Japan Patent Application No. 2013-556669, 8 pages.
U.S. Appl. No. 61/449,072, filed Mar. 3, 2011, entitled, Library-Operating-System Packaging-Model Scenarios, 35 pages.
Notice of Allowance mailed Oct. 9, 2015 from U.S. Appl. No. 13/323,562, 8 pages.
Notice of Allowance mailed Oct. 29, 2015 from U.S. Appl. No. 13/323,562, 5 pages.
Supplementary European Search Report mailed Sep. 3, 2014 from European Patent Application No. 12858587.4, 3 pages.
Response filed Oct. 6, 2015 to Final Office Action mailed Jul. 22, 2015 from U.S. Appl. No. 13/323,465, 21 pages.
Request for Continued Examination and Response to Final Office Action filed Aug. 14, 2013 from U.S. Appl. No. 12/834,895, 15 pages.
Notice of Allowance mailed Sep. 21, 2015 from U.S. Appl. No. 12/834,895, 8 pages.
Response filed Oct. 21, 2015 to Final Office Action mailed Jul. 22, 2015 from U.S. Appl. No. 13/372,390, 18 pages.
Response filed Apr. 20, 2015 to the First Office Action mailed Dec. 3, 2014 from China Patent Application No. 201210533610.9, 9 pages.
Response filed Oct. 21, 2015 to the Second Office Action mailed Aug. 21, 2015 from China Patent Application No. 201210533610.9, 9 pages.
Notice of Allowance mailed Jul. 31, 2014 from U.S. Appl. No. 12/972,081, 10 pages.
Final Office Action mailed Sep. 22, 2015 from U.S. Appl. No. 13/196,235, 36 pages.
Examiner Initiated Interview Summary mailed Sep. 26, 2013 from U.S. Appl. No. 13/196,235, 1 pages.
Applicant Initiated Interview Summary mailed Sep. 24, 2014 from U.S. Appl. No. 13/196,235, 3 pages.
Response filed Oct. 3, 2014 to Non-Final Office Action mailed Jul. 3, 2014 from U.S. Appl. No. 13/196,235, 28 pages.
Final Office Action mailed Nov. 21, 2014 for U.S. Appl. No. 13/196,235, 31 pages.
Response filed Mar. 2, 2015 to Final Office Action mailed Nov. 21, 2014 from U.S. Appl. No. 13/196,235, 22 pages.
Non-Final Office Action mailed Mar. 17, 2015 for U.S. Appl. No. 13/196,235, 33 pages.
Response filed Jun. 17, 2015 to Non-Final Office Action mailed Mar. 17, 2015 from U.S. Appl. No. 13/196,235, 24 pages.
Voluntary Amendment filed Nov. 9, 2015 from Japan Patent Application No. 2014-547269, 7 pages.
Office Action and Search Report mailed Nov. 18, 2015 from Taiwan Patent Application No. 101112828, 7 pages.
Response filed Nov. 13, 2015 to Non-Final Office Action mailed Jun. 25, 2015 from U.S. Appl. No. 13/314,512, 8 pages.
Decision on Appeal mailed Dec. 24, 2015 from U.S. Appl. No. 12/463,892, 7 pages.
Second Office Action mailed Nov. 30, 2015 from China Patent Application No. 201210537282.X, 7 pages.
Final Office Action mailed Dec. 14, 2015 from U.S. Appl. No. 13/314,512, 14 pages.
Pre-Brief Conference Request and Notice of Appeal filed Feb. 22, 2016 from U.S. Appl. No. 13/196,235, 7 pages.
Advisory Action mailed Feb. 22, 2016 from U.S. Appl. No. 13/196,235, 3 pages.
Pre-Brief Appeal Conference Decision mailed Mar. 17, 2016 from U.S. Appl. No. 13/196,235, 2 pages.
Brickell et al., "Direct Anonymous Attestation," Proceedings of the 11th ACM Conference on Computer and Communications Security, ACM, 2004, 30 pages.
Preliminary Amendment filed Nov. 23, 2015 from U.S. Appl. No. 14/850,557, 7 pages.
Votice on the First Office Action mailed Jan. 26, 2016 from China Patent Application No. 201280011551.7, 12 pages.
Non-Final Office Action mailed Feb. 1, 2016 from U.S. Appl. No. 13/331,078, 9 pages.
Mergen et al., "Virtualization for High-Performance Computing", ACM SIGOPS Operating Systems Review, vol. 40, Issue 2, Apr. 2006, p. 8-11, 4 pages.
Corrected Notice of Allowability mailed Mar. 24, 2016 from U.S. Appl. No. 12/834,895, 7 pages.
Notice of Allowance mailed Mar. 7, 2016 from U.S. Appl. No. 12/834,895, 51 pages.
Response filed Feb. 4, 2016 to the Second Office Action mailed Nov. 30, 2015 from China Patent Application No. 201210537282.X, 7 pages.
Applicant Initiated Interview Summary mailed Feb. 10, 2016 from U.S. Appl. No. 12/463,892, 3 pages.
Response filed Feb. 23, 2016 to Final Office Action mailed Jun. 14, 2012 and PTAB Decision of Jan. 8, 2016 from U.S. Appl. No. 12/463,892, 16 pages.
Response and After Final Consideration Program Request filed Jan. 15, 2016 to the Final Office Action mailed Oct. 1, 2015 from U.S. Appl. No. 13/215,244, 17 pages.
Advisory Action and After Final Consideration Program Decision mailed Feb. 24, 2016 from U.S. Appl. No. 13/215,244, 9 pages.
Final Office Action mailed Apr. 5, 2016 from U.S. Appl. No. 13/215,244, 23 pages.
International Preliminary Report on Patentability mailed Sep. 12, 2013 from PCT Patent Application No. PCT/US2012/027635, 6 pages.
Response filed Feb. 18, 2016 from Taiwan Patent Application No. 101112828, 20 pages.
First Office Action and Search Report mailed Jan. 26, 2016 from China Patent Application No. 201280011551.7, 12 pages.
Response filed Dec. 31, 2015 to Final Office Action mailed Jul. 16, 2015 from U.S. Appl. No. 13/331,078, 9 pages.
Notice of Allowance mailed Mar. 11, 2016 from U.S. Appl. No. 13/323,562, 13 pages.
International Preliminary Report on Patentability mailed Jun. 26, 2014 from PCT Patent Application No. PCT/US2012/067660, 6 pages.
Notice of Allowance and Examiner-Initiated Interview Summary mailed Apr. 5, 2016 from U.S. Appl. No. 13/323,465, 21 pages.
International Preliminary Report on Patentability mailed Jun. 26, 2014 from PCT Patent Application No. PCT/US2012/067662, 8 pages.
Third Office Action mailed Feb. 26, 2016 from China Patent Application No. 201210533610.9, 8 pages.
Response filed Feb. 5, 2016 to Final Office Action mailed Sep. 22, 2015 from U.S. Appl. No. 13/196,235, 30 pages.
Lorch, Jacob R. and Smith, Alan Jay, "The VTrace Tool: Building a System Tracer for Windows NT and Windows 2000", MSDN Magazine, vol. 15, No. 10, 2000, pp. 86-90, 93-94, 96-98, 101-102, 12 pages.
Non-Final Office Action mailed Apr. 19, 2016 from U.S. Appl. No. 12/463,892, 71 pages.
Appeal Brief mailed Apr. 18, 2016 from U.S. Appl. No. 13/196,235, 52 pages.
Response filed May 9, 2016 to the Final Office Action mailed Dec. 14, 2015 from U.S. Appl. No. 13/314,512, 8 pages.
Notice of Allowance mailed May 9, 2016 from Taiwan Patent Application No. 101112828, 4 pages.
Response filed May 2, 2016 to the Non-Final Office Action mailed Feb. 1, 2016 from U.S. Appl. No. 13/331,078, 9 pages.
Notice of Allowance mailed Apr. 18, 2016 from China Patent Application No. 20120537282.X, 4 pages.

(56) References Cited

OTHER PUBLICATIONS

Notice of Allowance mailed Apr. 5, 2016 from U.S. Appl. No. 13/372,390, 24 pages.
Office Action mailed Mar. 9, 2016 from Japan Patent Application No. 2013-556669, 10 pages.
Response filed Jun. 7, 2016 to First Office Action mailed Jan. 26, 2016 from China Patent Application No. 20128001155.7, 11 pages.
Takahashi, Hidekazu, "Where is OS Heading Now?", Nikkei Byte, Nikkei BP Publishing Co., Ltd., Sep. 22, 2003, No. 245, pp. 68-73, 9 pages.
Aaraj et al., "Energy and Execution Time Analysis of a Software-based Trusted Platform Module," IEEE 2007 Design, Automation & Test in Europe Conference & Exhibition, Apr. 16, 2007, pp. 1-6, 6 pages.
Durahim et al., "Implementing a Protected Zone in a Reconfigurable Processor for Isolated Execution of Cryptographic Algorithms," IEEE, 2009, International Conference on Reconfigurable Computing and FPGAs, Dec. 9, 2009, pp. 207-212, 6 pages.
Response filed Sep. 19, 2016 to the Non-Final Office Action mailed Apr. 19, 2016 from U.S. Appl. No. 12/463,892, 19 pages.
Final Office Action mailed Aug. 10, 2016 from U.S. Appl. No. 13/331,078, 10 pages.

\* cited by examiner

FIG. 4A

| FILE NAME 401 | TRANSLATION TABLE 304 | |
|---|---|---|
| | GUEST ISA ADDRESS 402 | HOST ISA ADDRESS 403 |
| GuestOS_DLL_1 | 0xDD001100 | 0x88100000 |
| GuestOS_DLL_2 | 0xDD002100 | 0x88200000 |

FIG. 4B

| FILE NAME 401 | TRANSLATION TABLE 304 | |
|---|---|---|
| | GUEST ISA ADDRESS 402 | HOST ISA ADDRESS 403 |
| App_DLL_1 | 0x0F001100 | 0x88000000 |
| GuestOS_DLL_1 | 0xDD001100 | 0x88100000 |
| GuestOS_DLL_2 | 0xDD002100 | 0x88200000 |

FIG. 4C

| FILE NAME 401 | TRANSLATION TABLE 304 | |
|---|---|---|
| | GUEST ISA ADDRESS 402 | HOST ISA ADDRESS 403 |
| App_DLL_1 | 0x0F001100 | 0x88000000 |
| App_DLL_2 | 0x0F001200 | 0x88300000 |
| GuestOS_DLL_1 | 0xDD001100 | 0x88100000 |
| GuestOS_DLL_2 | 0xDD002100 | 0x88200000 |

INSTRUCTION SET EMULATION FOR GUEST OPERATING SYSTEMS

BACKGROUND

Computer applications are often programmed to interface with an operating system that provides various functions to the applications. For example, operating systems can provide lower-level services such as device drivers and memory management routines, or higher-level services such as graphical user interface application programming interfaces ("APIs"). In some cases, a particular application may only be provided for a particular operating system. For example, an application may be implemented on one or more versions of Windows®, but may not have been ported to Unix® or other operating systems.

Computer applications are also often limited to certain instruction set architectures. For example, an application can be compiled into binary code for one instruction set architecture, e.g., x86. This binary code generally will not execute on a different instruction set architecture, e.g., a PowerPC processor. Rather, different compiled binaries normally need to be generated for each instruction set architecture on which the application is expected to run.

Traditional techniques to allow application portability across operating systems and instruction set architectures tend to be relatively inefficient and cumbersome. For example, virtual machine monitors can allow a copy of a guest operating system to execute on a computer system with a different underlying host operating system. However, this approach generally involves executing full copies of both the guest operating system as well as the underlying host operating system. Likewise, central processing unit ("CPU") emulators can be used to translate code into different instruction sets at runtime instead of using precompiled binaries. However, these emulators generally have a substantial memory and processor footprint that do not lend them to efficient integration with a guest operating system executing on a virtual machine.

SUMMARY

This document relates to virtual computing techniques. One implementation is manifested as a technique that can include receiving a request to execute an application. The application can include first application instructions from a guest instruction set architecture. The technique can also include loading an emulator and a guest operating system into an execution context with the application. The emulator can translate the first application instructions into second application instructions from a host instruction set architecture. The guest operating system can provide at least one guest operating system interface that is called by the application. The technique can also include running the application by executing the second application instructions.

Another implementation is manifested as a system that can include an emulator configured to receive a request from a guest operating system to load first instructions in a guest instruction set architecture. The emulator can also be configured to check a translation table to determine whether corresponding second instructions are available in a host instruction set architecture, and, in a first instance when the second instructions are available, load the second instructions. The emulator can also be configured to, in a second instance when the second instructions are not available, delay translating the first instructions until a request to execute the first instructions is received. The system can also include at least one processing device configured to execute the emulator.

Another implementation is manifested as a computer-readable storage media that can include instructions. The instructions can be executed by one or more processing devices, which can cause the one or more processing devices to perform receiving a request to execute an application on a host device. The host device can have a host instruction set architecture and a host operating system. The application can include one or more application binaries. The acts can also include checking application metadata associated with the application to identify an instruction set architecture and an operating system for the application. When the instruction set architecture for the application corresponds to the host instruction set architecture and the operating system for the application is the host operating system, the application can be loaded in an execution context. When the instruction set architecture for the application corresponds to the host instruction set architecture and the operating system for the application is different than the host operating system, the application can be loaded together with a guest operating system for the application an execution context. When the instruction set architecture for the application is different than the host instruction set architecture and the operating system for the application is different than the host operating system, the application, an emulator, and a guest operating system for the application can be loaded together in an execution context.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIG. 4A-4C show an exemplary table in accordance with some implementations of the present concepts.

DETAILED DESCRIPTION

Overview

Figure 1:
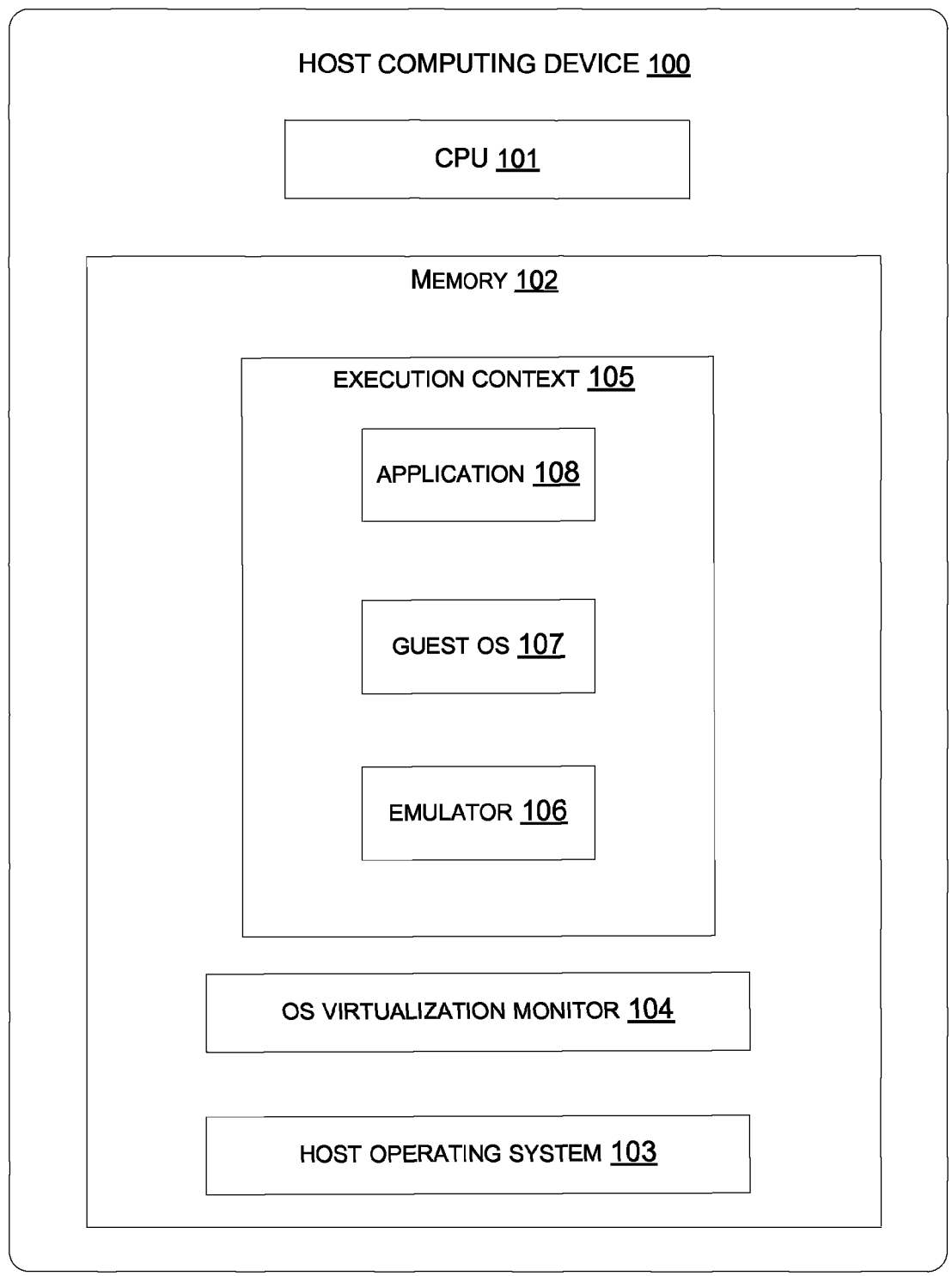
FIGS. 1 and 5 show exemplary architectures of a host computing device in accordance with some implementations of the present concepts.

This document relates to virtual computing techniques performed on a host device, and more particularly to implementing a guest operating system ("OS") and/or an application in a different instruction set architecture ("ISA") than that of the host device. Generally speaking, the host device can have a host OS operating thereon, which can execute in the native ISA of the host device. The host OS can interact directly with the hardware of the host device to provide normal OS functionality. For example, the host OS can provide functionality such as memory management, thread creation, thread synchronization, input/output streams, creating windows and/or dialog boxes, etc.

Generally speaking, the host OS can provide this functionality to various applications via one or more interfaces such as APIs or application binary interfaces ("ABIs"). The host OS interfaces are collectively referred to herein as the "host OS application interface set." In many cases, applications are configured to make calls to functions provided by a particular OS. If these functions are supported by the host OS application interface set, the application can generally interface directly with the host OS. If not, the application can have limited or no compatibility with the host OS. For example, a Unix® machine may not implement any Windows® application interfaces, and thus a Windows® application typically will not run directly on a Unix® machine. Even different versions of an operating system may deprecate individual functions, implement them in unexpected ways, or otherwise render the operating system incompatible with the application. For example, an application that is configured to run on Windows® 98 may attempt to call various application interfaces that are deprecated in a newer OS such as Windows® 7. This may render the application partially or completely inoperable on a machine that is running Windows® 7.

One way to handle this problem is to implement a guest operating system that runs on the host operating system. The guest OS can also implement a set of application interfaces (API's or ABI's), referred to herein collectively as the "guest OS application interface set." If the guest operating system implements individual application interface calls as expected by the application, the application can interface with the guest operating system and function properly. This is generally true regardless of whether the host OS application interface set also supports the functions called by the application. However, as mentioned above, running two full copies of different operating systems concurrently can often be quite inefficient. Moreover, this problem can be compounded when the application executes in a different instruction set than the hardware of the host device.

The disclosed implementations provide a guest operating system that can support applications that execute in a different ISA than the host device. The guest OS can interface to an OS virtualization monitor ("OS VM") that provides a relatively small set of abstractions to the guest OS. These abstractions can be built via individual binary calls from the guest OS to the OS virtualization monitor. Collectively, the individual binary calls implemented by the OS virtualization monitor are referred to herein as the "OS VM interface set" or "VM interface set."

The guest OS can make calls to implement the guest OS interface set in a manner that is consistent with the expectations of applications that are configured to use individual guest OS interfaces. If the application is in a different instruction set than the host device, the application and the guest OS can execute on a CPU emulator. The guest OS can make calls to the VM interface set to implement the guest OS application interface set as expected by the application. From the perspective of the application, the guest OS is supporting the application via memory management, thread creation, thread synchronization, input/output streams, creating windows and/or dialog boxes, etc. In some implementations, the application can execute on the CPU emulator in the same execution context as the guest OS, e.g., a single user-mode process.

Using the above-described architecture, the application can execute using both a different instruction set and a different OS application interface set than is provided by the underlying host device and OS. Moreover, because the application can execute together with the guest OS in a user-mode process, the guest OS can be implemented in user-mode instructions that share security permissions with user-mode instructions of the application. This can also substantially reduce the resource footprint of the guest OS and CPU emulator, because the guest OS and CPU emulator do not need to provide support for kernel mode instructions in the guest ISA. Instead, only the host OS needs to execute kernel mode instructions in the native ISA.

Example System

For purposes of explanation, consider introductory FIG. 1. FIG. 1 shows an exemplary architecture of a host computing device 100 that is configured to accomplish the concepts described above and below. Host computing device 100 can include a central processing unit ("CPU") 101 that is operably connected to a memory 102. For example, CPU 101 can be a reduced instruction set computing (RISC) or complex instruction set computing (CISC) microprocessor that is connected to memory 102 via a bus. Memory 102 can be a volatile storage device such as a random access memory (RAM), or a non-volatile memory such as FLASH memory. Although not shown in FIG. 1, host computing device 100 can also include various input/output devices, e.g., a keyboard, a mouse, a display, a printer, etc. Furthermore, the host computing device can include one or more non-volatile storage devices, such as a hard disc drive (HDD), optical (compact disc/digital video disc) drive, tape drive, etc. Generally speaking, any data processed by host computing device 100 can be stored in memory 102, and can also be committed to non-volatile storage. As used herein, the term "computer-readable media" can include transitory and non-transitory instructions. In contrast, the term "computer-readable storage media" excludes transitory instances, and includes volatile or non-volatile storage devices such as random access memory, optical disks, hard drives, flash drives, etc.

Memory 102 of host computing device 100 can include various components that implement certain processing described herein. For example, memory 102 can include a host operating system 103. Generally speaking, host operating system 103 can be a fully functional operating system such as found on a modern personal computer, server, tablet, cell phone, or other computing device. For example, host operating system 103 can be a version of Windows®, Unix® (including related operating systems such as OS X®), Linux® (including related operating systems such as Android®), a real-time and/or embedded operating system, etc. Host operating system 103 can include one or more binary files that are in the native or host ISA for CPU 101.

Memory 102 can also include an operating system virtualization monitor 104 and an execution context 105. Execution context 105 can include a process, thread, task, or other execution context that includes an emulator 106, a guest operating system 107, and an application 108. Note that host OS 103 and/or OS virtualization monitor 104 can generally be implemented via one or more other execution contexts. In some implementations, execution context 105 includes a single address space that is shared by emulator 106, guest OS 107, and application 108. Said another way, execution context 105 includes memory that is allocated specifically for use by any of emulator 106, guest OS 107, and application 108, and that is not available for use by other execution contexts on host computing device 100.

Generally speaking, guest operating system 107 can be configured to provide a guest OS application interface set for applications such as application 108. Operating system virtualization monitor 104 can be configured to provide a set of virtualization interfaces to guest operating system 107, e.g., the OS VM interface set. Host OS 103 can be configured to provide a host OS application interface set to OS VM 104. Generally speaking, emulator 106, OS VM 104, and host OS 103 can be implemented in the host ISA. Application 108 and guest operating system 107 can each include one or more binary files that include instructions in the guest ISA which can be different than the host ISA.

Emulator 106 can be configured to provide instructions that are translated from the guest ISA to the host ISA so that the translated instructions can be executed on CPU 101. For example, emulator 106 can be configured to compile a set of instructions from the guest ISA into the host ISA. Emulator 106 can also be configured to obtain a previously-translated set of instructions in the host ISA. For example, emulator 106 can be configured to track instructions from the guest ISA that have already been compiled into the host ISA and use the previously-compiled instructions rather than recompiling them. Emulator 106 can also interpret and/or just-in-time compile guest ISA instructions into the host ISA, as set forth in more detail below.

In some implementations, CPU 101 can have different levels of privileges for individual instructions. For example, an x86 processor can have certain instructions that can only be executed in a "kernel mode" that are not available to "user mode" programs. In such implementations, host operating system 103 can include binaries that execute in kernel mode, but only allow access to CPU 101 via user mode instructions for execution context 105. Said differently, execution context 105 can be a user mode execution context, whereas host operating system 103 can include at least one kernel mode execution context, e.g., a Windows® system process. More generally, host operating system 103 can include at least one privileged execution context that has at least some higher privileges than execution context 105.

In some implementations, host operating system 103 can implement lower-level operating system functionality such as timers, interrupts, input/output, virtual memory (e.g., accessing a page table maintained by CPU 101), pointer validation, and/or context switching by switching to the privileged execution context, e.g., kernel mode. Host operating system 103 can also implement "rich" operating system functionality via one or more interfaces for application configuration, graphical user interfaces, etc., in a non-privileged execution environment such as a user mode process. Host operating system 103 can provide both the lower-level and rich functionality via the host OS application interface set.

However, because application 108 is generally configured to interface with guest OS 107 instead of host OS 103, application 108 may not be configured to use the host OS application interface set. Instead, guest operating system 107 can provide such operating system functionality via a guest OS application interface set. The guest OS application interface set can include at least some application interfaces that are particular to guest operating system 107 and that may not be provided by host operating system 103. Because these interfaces are provided by guest OS 107, application 108 does not need to be ported, recompiled, or otherwise modified to interface directly with host operating system 103. Moreover, because guest operating system 107 and application 108 are operable on emulator 106, application 108 can also execute binary code that is in a different ISA than the native ISA for CPU 101. Thus, application 108 can run directly within execution context 105 even though application 108 may have originally been built for both a different operating system and a different architecture than host computing device 100.

Note, however, that in some implementations, part or all of guest OS 107 and application 108 can run in a kernel mode process, e.g., execution context 105. OS VM 104 can cause the kernel mode process to appear to application 108 as a user-mode process. For example, OS VM 104 can prevent application 108 from executing any kernel mode instructions, while OS VM 104 can allow guest OS 107 to execute kernel mode instructions.

OS VM 104 can also service certain requests by application 108 with responses that are consistent with application 108 executing in a user-mode process. For example, application 108 can execute an instruction in the guest ISA that reads a register value from emulator 106. The register value can represent the privilege mode in which application 108 executes in the guest ISA. OS VM 104 can respond to application 108 with a value that indicates that application 108 is executing in a non-privileged mode. This can be true even when execution context 105 is actually a privileged execution context provided by host OS 103 and can execute privileged instructions in the host ISA.

As a specific example, consider a scenario where the guest ISA is an x86 instruction set. Application 108 can execute an x86 PUSHFD instruction and receive a response indicating that application 108 is executing in Ring 3 of the x86 ISA. However, execution context 105 (e.g., guest OS 107 and/or emulator 106) may actually have access to Ring 0x86 functionality. Note that this may also mean that corresponding host ISA instructions can be executed by guest OS 107 and/or emulator 106, but not application 108.

Furthermore, note that, in some implementations, guest operating system 107 does not need to fully implement certain lower-level operating system functionality discussed above with respect to host operating system 103. Rather, guest operating system 107 can be built to use calls to the VM interface set to provide such functionality to application 108. OS VM 104 can translate these calls into corresponding calls from the host OS application interface set and host OS 103 can handle the calls in the host ISA. This implementation can reduce the footprint of guest operating system 107 while still providing the flexibility to support the complete guest OS application interface set.

Figure 2:
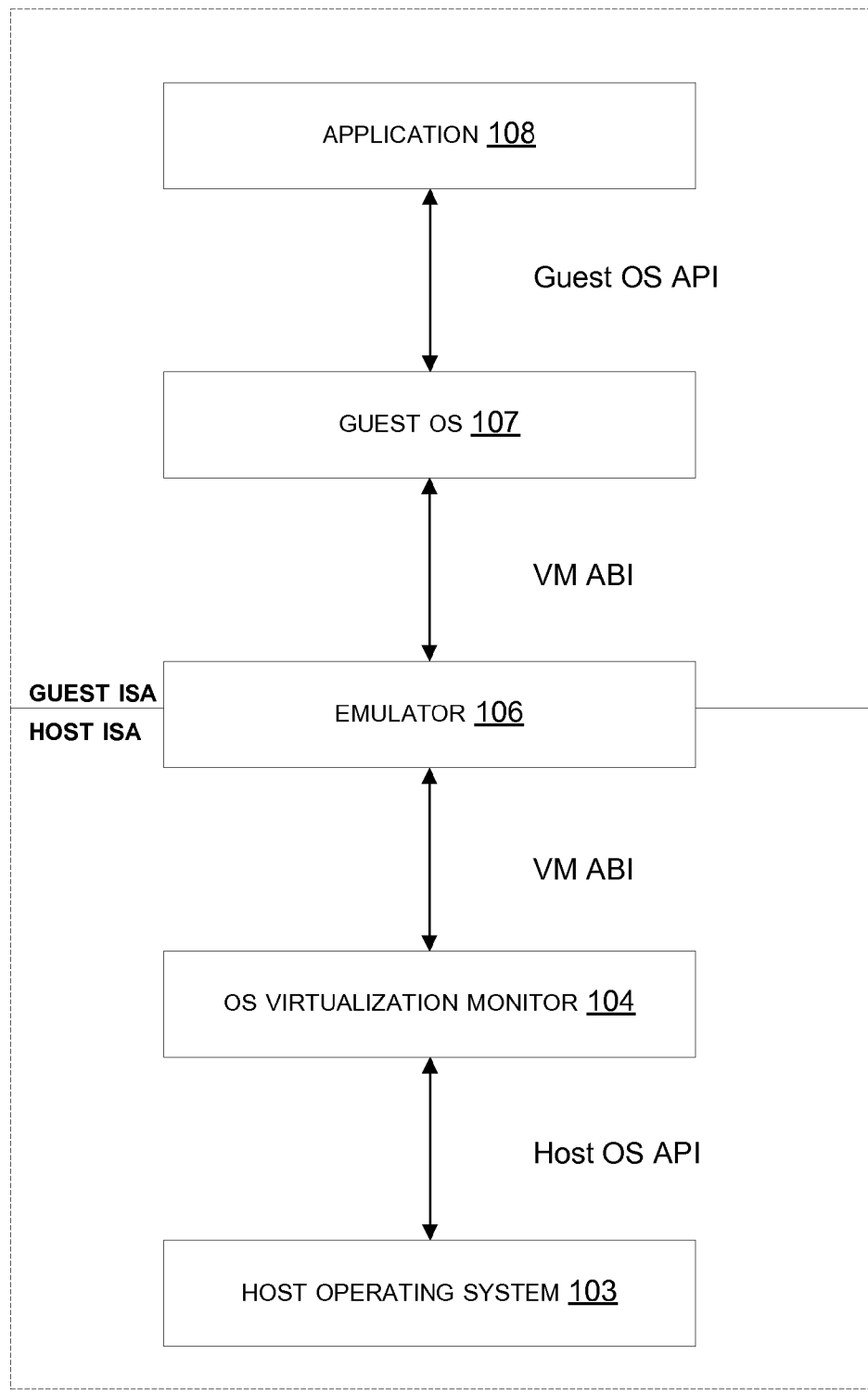
FIG. 2 shows an exemplary logical architecture in accordance with some implementations of the present concepts.

FIG. 2 shows an exemplary logical architecture of communications between certain components of host computing device 100. Generally speaking, application 108 can include one or more binary files in the guest ISA. These binaries can be translated by emulator 106 into the host ISA and run directly on CPU 101 in the host ISA.

However, some or all of the application binaries may use calls to the guest OS application interface set. These calls are also generally in the guest ISA, but rely on guest OS 107 to perform some functionality for application 108. Guest OS 107 can include one or more binaries in the guest ISA that implement the functions provided via the guest OS application interface set. Some of these binaries can also be translated by emulator 106 into the host ISA and execute directly on CPU 101. For example, in some implementations, guest OS 107 can draw a window for application 108 using only its own translated code via emulator 106. Guest OS 107 may be able to do so because the window can be drawn without using privileged instructions such as kernel mode instructions.

However, in some cases, application 108 may make a guest OS interface call that guest OS 107 cannot satisfy directly. For example, application 108 may request to access a file or create a new thread. Guest OS 107 may need to interface with OS virtualization monitor 104 to implement these operations, because these operations may require privileged (e.g., kernel mode) instructions and/or file system access privileges. Guest OS 107 can access files, create new threads, etc. by making calls to the VM interface set in the guest ISA. Emulator 106 can translate these calls into the host ISA. The translated VM interface calls can be provided to OS VM 104, which can execute them in the host ISA.

In some cases, the VM interface calls are implemented by OS VM 104 via one or more calls to host OS application interfaces. Indeed, some VM interface calls are simply wrappers for the underlying host OS calls, e.g., creating threads or allocating virtual memory. In other cases, the guest OS can add a layer of functionality on top of host OS 103 calls to OS VM 104. To do so, OS VM 104 can make calls to high level services provided by host OS 103, such as file input/output, threading, synchronization, etc.

For example, OS VM 104 can enforce permissions for application 108, guest OS 107, and/or emulator 106. OS VM 104 can do so using a single set of permissions associated with execution context 105 for various operations. Thus, for example, OS VM 104 can prevent application 108 from accessing a particular file by not allowing any instructions from execution context 105 to access the file. This implementation allows guest OS 107 and application 108 to share a common set of permissions.

Guest OS 107 can also provide device support for devices such as displays, printers, keyboards, mice, etc. via a remote desktop protocol ("RDP) instead of using a conventional device driver. Guest OS 107 can do so by receiving calls to the guest OS application interface set from application 108 and communicating with the devices via the RDP protocol. The RDP protocol can be implemented via communication pipes that are routed through OS VM 104 to host OS 103. Host OS 103 can receive the RDP calls and control the devices via device drivers that are part of host OS 103. Note that the communication pipes can cross machine boundaries, e.g., over a network or other type of communication link.

Figure 3:
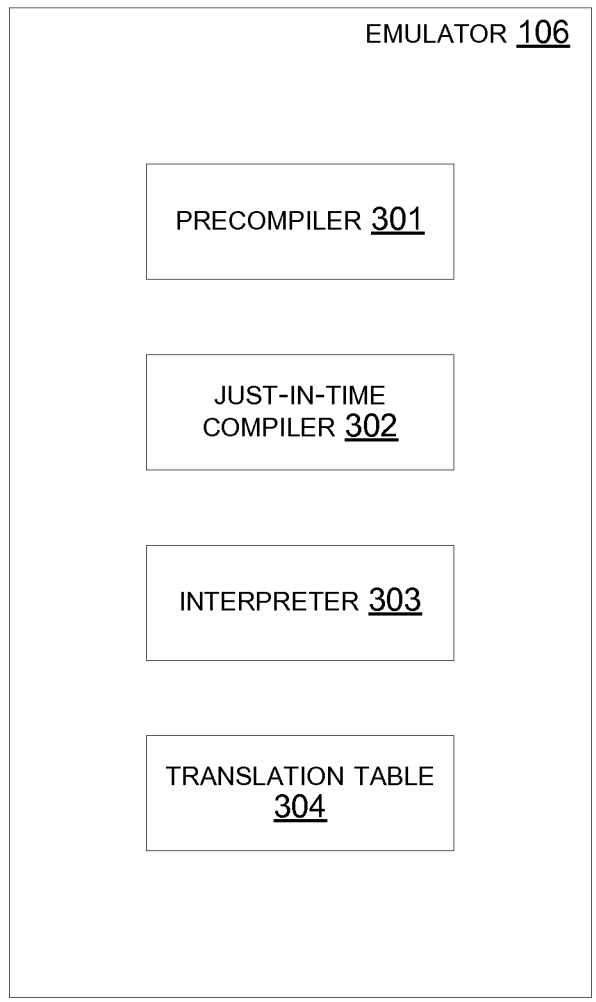
FIG. 3 shows an exemplary architecture of an emulator in accordance with some implementations of the present concepts.

FIG. 3 shows an exemplary architecture of emulator 106. Generally speaking, emulator 106 can use different techniques to obtain translated binaries for guest operating system 107 and/or application 108. For example, CPU emulator 106 can include a precompiler 301, a just-in-time ("JIT") compiler 302, and/or an interpreter 303.

Using precompiler 301, CPU emulator 106 can translate binary files of guest OS 107 and/or application 108 from the guest ISA to the host ISA. Generally speaking, precompiler 301 can translate the binaries before the binaries are invoked for execution, e.g., precompiler 301 can translate binaries for guest OS 107 offline before guest OS 107 is loaded into execution context 105. Likewise, precompiler 301 can translate the binaries for application 108 before application 108 is loaded into execution context 105. For example, precompiler 301 can load one or more binaries of application 108 and/or guest OS 107 from storage into memory 102, translate them from the guest ISA to the host ISA, and store the corresponding host ISA binaries for later usage.

Under some circumstances, precompilation is not necessarily suitable. For example, a user may request to initiate application 108 and/or guest operating system 107 on host computing device 100 before precompiled binaries in the host ISA are obtained by emulator 106. As another example, application 108 may generate code at runtime in the guest ISA which needs to be translated into the host ISA while application 108 and guest OS 107 are already running. Under such circumstances, the binaries can be translated at runtime by just-in-time compiler 302 and/or interpreter 303.

Generally speaking, just-in-time compiler 302 compiles a group of instructions (binary) in the guest ISA the first time they are executed, caches the compiled instructions as one or more binaries in the corresponding host ISA, then executes the cached host ISA binaries each time the corresponding binaries in the guest ISA are invoked afterwards. In contrast, interpreter 303 translates guest ISA instructions into host ISA sequentially and generally does not compile or cache the translated host ISA instructions. Rather, each time the guest ISA instructions are invoked, interpreter 303 performs the translation and executes the host ISA instructions, but does not retain the translated host ISA instructions for later use.

Note that, in some implementations, the translation techniques mentioned above can be performed using source files instead of binaries. For example, one or more source files of guest OS 107 and/or application 108 can be compiled and/or linked by precompiler 301, just-in-time compiler 302, and/or interpreter 303 instead of performing the translation of binaries. Generally speaking, however, many applications and operating systems are distributed only as binaries and the techniques disclosed herein can be performed without access to source code for either guest OS 107 or application 108.

Note that there may be certain performance trade-offs associated with which of the above-mentioned techniques is used for translation. When possible, precompiling can provide good performance because the host ISA binaries are available when application 108 and/or guest OS 107 begins execution. This is because there is no need to translate the guest ISA instructions at runtime, the precompilation process can be performed offline prior to their execution. Furthermore, the precompiled binaries can be resident in shared memory. This can be particularly useful in circumstances where multiple applications execute the same binary code on emulator 106, because the applications themselves may have different address spaces in their respective execution contexts. By storing the precompiled host ISA binary in shared memory, the applications sharing the host ISA binary do not need to each have a copy of the host ISA binary in the address space for their respective execution contexts. Rather, the host ISA binary can be shared between multiple execution contexts, each of which can include an application and/or guest OS.

Just-in-time compiling, on the other hand, generally occurs while application 108 and/or guest OS 107 is already executing. Moreover, just-in-time compiling generally results in a host ISA binary that is stored in the private address space for the application, e.g., in memory that is allocated to the application's execution context. The first time a given set of instructions is executed by application 108, the instructions are compiled into the host ISA. This can result in a certain amount of latency because the compilation can use a substantial amount of computational resources, e.g., heavy processor loading on CPU 101, substantial usage of memory 102, and/or the time to read the guest ISA binary from storage into memory 102.

However, when using just-in-time compiler 302, once a given set of instructions has been compiled into the host ISA, they do not need to be recompiled each time the corresponding guest ISA instructions are invoked. In contrast, interpreter 303 generally translates guest ISA instructions sequentially and does not cache translated instructions. This can prevent the one-time latency issue mentioned above for just-in-time compilation. However, because the host ISA instructions are not cached for later use by interpreter 303, the host ISA instructions need to be generated each time the corresponding guest ISA instructions are invoked. Also, many interpreters produce code that is not optimized or is otherwise relatively inefficient in comparison to code that is compiled by precompiler 301 and/or just-in-time compiler 302.

Emulator 106 can also maintain a translation table 304. For example, translation table 304 can be used by emulator 106 to check whether a particular set of guest ISA instructions have been translated into host ISA instructions and loaded for execution. By doing this check before translating the guest ISA instructions with precompiler 301, just-in-time compiler 302, or interpreter 303, emulator 106 can avoid unnecessary compilation overhead. Note that the term "table" is used generically to refer to many different data structures and that translation table 304 can be implemented using arrays, structures, classes, linked lists, trees, etc.

FIG. 4A-4C collectively illustrate an exemplary translation table 304 as it is populated by emulator 106 over time. Generally speaking, FIG. 4A illustrates translation table 304 prior to invoking application 108, FIG. 4B illustrates translation table 304 after application 108 loads a first binary file (App_DLL_1), and FIG. 4C illustrates translation table 304 after application 108 loads a second binary file (App_DLL_2). For the purposes of the following example, guest OS 107 has two binary files, GuestOS_DLL_1 and GuestOS_DLL_2, that are already precompiled and loaded in execution context 105 at the beginning of the following example.

As shown in FIG. 4A, translation table 304 can include a file name column 401, a guest ISA address column 402, and a host ISA address column 403. File name column 401 is provided to illustrate logical names for the binaries provided by guest operating system 107 and/or application 108 discussed herein. For example, guest operating system 107 can provide interfaces to functions that create and close a window via GuestOS_DLL_1, and interfaces to functions that create or manage virtual memory via GuestOS_DLL_2. These binaries can have addresses in the guest ISA shown at guest ISA address 402. The binaries can be translated into the host ISA, e.g., by precompiler 301, prior to executing guest OS 107 and/or application 108 on host computing device 100. The corresponding host ISA binaries can be loaded into memory and have host ISA addresses as shown in host ISA address column 403.

Application 108 can make calls to the guest OS application interface set by linking to the guest OS binaries at runtime. From the perspective of application 108, these binaries are located at the guest ISA addresses at column 402. When they are loaded by emulator 106, however, emulator 106 updates translation table 304 with the corresponding host ISA address 403. Note that host ISA address 403 can be a virtual memory address within the address space allocated to execution context 105, and may actually correspond to different physical addresses in memory 102. In such implementations, CPU 101 and/or host OS 103 can translate the virtual addresses to actual physical addresses on memory 102.

As described below, each time a load request for a guest ISA binary is received, emulator 106 can check translation table 304 to determine whether the corresponding host ISA binary has been previously compiled and loaded into memory. If so, emulator 106 does not need to translate the binary into the host ISA. Instead, emulator 106 can simply wait until the binary at the corresponding host ISA address 403 is executed and run the translated code at that time.

FIG. 4B illustrates translation table 304 in a configuration after application 108 is initiated and requests to load App_DLL_1 into execution context 105. Application 108 can load this binary via guest ISA instructions that reference the guest ISA address for App_DLL_1, e.g., 0x0F001100. Emulator 106 receives the file load operation from application 108 (e.g., via a call from application 108 to guest OS 107) and can check translation table 304 to determine whether a corresponding host ISA binary has already been loaded.

If the host ISA binary has already been loaded, the binary is ready to execute. If the host ISA binary has already been compiled but not loaded, e.g. precompiled and available in storage, them emulator 106 can load the precompiled binary and update translation table 304. If the host ISA binary is not yet available on storage, emulator 106 can wait until execution time and use just-in-time compiler 302 to translate App_DLL_1 into the host ISA. At that time, emulator 106 can make a new entry in translation table 304 that includes the guest ISA address for App_DLL_1 as well as the corresponding host ISA address where the translated binary is loaded. Then, emulator 106 will not need to recompile App_DLL_1 if application 108 attempts to load this file again. Rather, emulator 106 can receive the guest ISA address for this file from application 108, determine that there is a corresponding host ISA address that is already loaded with a host ISA binary by checking translation table 304, and later execute the corresponding host ISA binary without needing to translate the file into the host ISA again.

FIG. 4C illustrates translation table 304 in a configuration after application 108 loads a binary file entitled App_DLL_2. As discussed above, the first time App_DLL_2 is loaded, an entry is made into translation table 304. The binary can be translated at execution time by just-in-time compiler 302 or can be precompiled. Upon loading the translated binary, emulator 106 makes another new entry in translation table 304 that includes the guest ISA address for App_DLL_2, as well as the corresponding host ISA address for the corresponding translated binary.

To the extent feasible, it can be useful to precompile as many binaries as possible for guest OS 107 and/or application 108. For example, if host computing device 100 is intended to permanently support the guest OS 107, it can be desirable to precompile all of the binaries for the guest OS, or at least those binaries that are most likely to be used at runtime by applications. Then, the binaries are available to be loaded and updated in translation table 304 responsive to receiving the corresponding guest ISA load instruction. Likewise, if application 108 is expected to remain on host computing device 100 for any sustained period of time, it can also be desirable to precompile all binaries associated with application 108. In some implementations, emulator 106 and/or OS VM monitor 104 can track usage statistics associated with individual guest OS binaries and/or application binaries and precompile more frequently-used binaries while leaving other binaries to be compiled at runtime by just-in-time compiler 302 and/or interpreter 303. This can reduce the amount of memory required for execution context 105 except in instances where the infrequently-used binaries are actually loaded by application 108 and/or guest OS 107.

However, in some implementations, it may be more feasible or desirable to not precompile all, or even any, of the binaries associated with guest OS 107 and/or application 108. For example, if the execution of guest OS 107 and/or application 108 is intended to be temporary, e.g., a single use, it can be more efficient to interpret and/or just-in-time compile all of the binaries into the host ISA.

Furthermore, certain binaries may be particular to certain hardware. For example, sometimes two different processors can implement the same basic host ISA. One of the processors may use an arithmetic logic unit ("ALU") to emulate floating point operations with integer operations, while the other may have an additional piece of hardware, e.g., a floating-point unit, that accepts certain floating-point instructions that are not in the basic host ISA. Under such circumstances, it is generally not desirable to compile binaries with the floating point instructions for the processor that does not have a floating point unit. Instead, these binaries would generally be compiled with the corresponding integer operations to implement the emulated floating point operations.

To accommodate these distinctions, emulator 106 can be configured to precompile all of the binaries for application 108 and/or guest OS 107 without the floating point instructions. At runtime, emulator 106 can perform a check to see whether CPU 101 includes the floating point unit. If so, binaries that include floating point operations can be just-in-time compiled or interpreted at runtime instead of executing the precompiled binaries. Otherwise, the precompiled floating point emulation integer operations can be executed instead. Alternatively, the binaries can be precompiled both with and without the floating point instructions ahead of time, and emulator 106 can load the appropriate binary at runtime after determining whether CPU 101 supports the floating point instructions.

Furthermore, note that guest operating system 107 may be substantially reduced in size relative to a "typical" full operating system. In some implementations, guest operating system 107 may even have a smaller memory, disk, and/or processor footprint than application 108. Accordingly, in some implementations, guest operating system 107 and/or application 108 can be configured together in an installer that installs both guest OS 107 and application 108 together on host computing device 100. In such implementations, the installer may check to ensure that host computing device 100 has an appropriate emulator 106 for the guest ISA before going ahead with the installation. The installer can also check CPU 101 to see whether CPU 101 supports certain instructions, such as the aforementioned floating point instructions, and install different binaries for application 108 and/or guest OS 107 depending on whether the instructions are supported.

Figure 5:
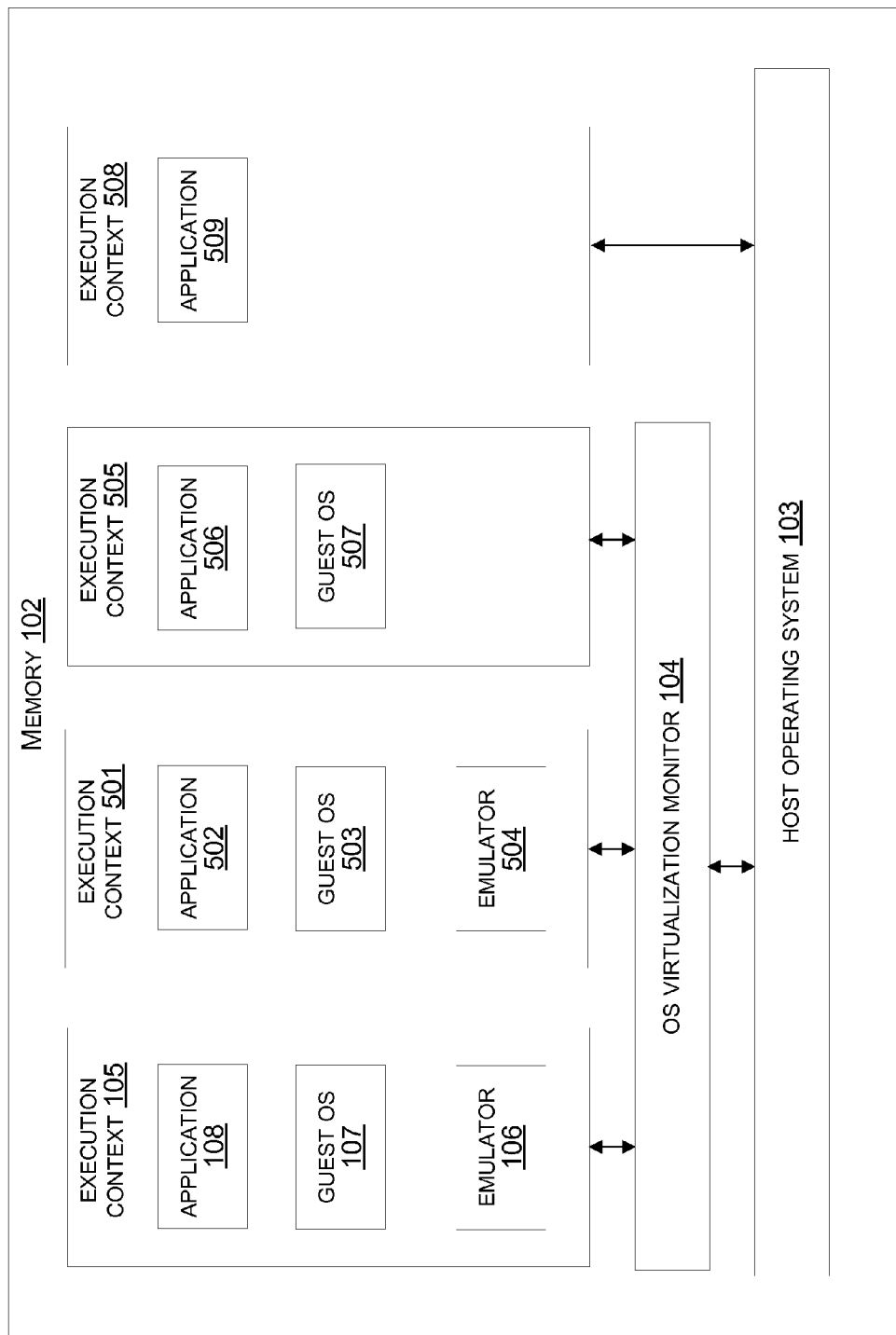

Using the techniques introduced above, it is possible to support applications configured for various instruction sets and operating systems concurrently on host computing device 100. FIG. 5 illustrates memory 102 in such a configuration. As shown in FIG. 5, another execution context 501 can reside in memory 102, and include another guest operating system 503 as well as another emulator 504. Guest operating system 503 can be the same operating system as guest OS 107, e.g., can provide the same application interface set, or can be a different operating system. Likewise, emulator 504 can support the same ISA as emulator 106 or a different ISA.

Memory 102 can also include an execution context 505 with an application 506 and a guest OS 507. Note, however, that execution context 505 is shown without an emulator. Execution context 505 may be appropriate when guest OS 507 and application 506 are implemented in the host ISA, but application 506 is configured for guest OS 507 instead of host OS 103. Each of execution context 105, 501, and 505 can be configured to communicate to host OS 103 via OS virtualization monitor 104.

Execution context 508 can include an application 509. Generally speaking, execution context 508 may be appropriate for applications that are in the host ISA and are implemented in the host ISA. Note that, because application 509 is configured for host OS 103, execution context 508 may communicate directly with host OS 103 instead of with OS virtualization monitor 104.

FIG. 5 illustrates several aspects of the disclosed implementations. First, note that each application can run in a different execution context, e.g., with a different address space. Moreover, when a guest operating system and/or emulator is needed to support a given application, the guest OS and/or emulator can be loaded into the execution context with the application. This allows the application, guest OS, and/or emulator within a given execution context to share a common set of permissions. For example, execution context 105 may have read-only access to a group of files. OS VM 104 can receive host ISA instructions from emulator 106 and enforce the permissions so that none of application 108, guest OS 107, and/or emulator 106 improperly writes to one of these files. From the perspective of OS VM 104 and/or host OS 103, it does not matter whether the application, guest OS, or CPU emulator is attempting an impermissible action.

Furthermore, using OS VM 104 can allow different emulators and/or guest operating systems the flexibility to run on other host devices with different underlying host operating systems and/or instruction sets. This is because OS VM 104 provides a layer of abstraction between the emulators/guest OS's and the underlying host device. Generally speaking, the guest OS and/or emulators use calls to the OS VM interface set instead of directly using the host OS application interface set. Thus, all that is needed for a given emulator and/or guest OS to run on a different host OS is an OS VM monitor that properly implements the OS VM interface set. Even if the other host device uses a different instruction set, the emulator and/or OS can simply be recompiled to the ISA for the host device where they will run.

The following is an exemplary interface set that can be provided by OS VM 104:

```
// Virtual Memory
DKSTATUS
DkVirtualMemoryAllocate(
    ____inout PVOID *BaseAddress,
    ____inout PSIZE_T RegionSize,
    ____in ULONG AllocationType,
    ____in ULONG Protect);
DKSTATUS
DkVirtualMemoryFree(
    ____in PVOID BaseAddress,
    ____in SIZE_T RegionSize,
    ____in ULONG FreeType);
DKSTATUS
DkVirtualMemoryProtect(
    ____inout PVOID BaseAddress,
    ____inout SIZE_T RegionSize,
    ____in ULONG NewProtect,
    ____out PULONG OldProtect);
// IPC
BOOL
DkPipeFork(
    ____in HANDLE Handle,
    ____out PULONG64 Token,
    ____out PHANDLE NewHandle);
BOOL
DkSelfPipeCreate(
```

```
        __out PHANDLE Handle1,
        __out PHANDLE Handle2,
        __out PULONG64 Token);
ULONG
DkPipeRead(
        __in HANDLE Handle,
        __in BOOL Async,
        __in PVOID AsyncToken,
        __inout PVOID *Buffer,
        __in ULONG Length,
        __in_opt PLONG64 Timeout);
ULONG
DkPipeWrite(
        __in HANDLE Handle,
        __in BOOL Async,
        __in PVOID AsyncToken,
        __in PVOID Buffer,
        __in ULONG Length);
ULONG
DkPipeSelect(
        __in ULONG Count,
        __in const HANDLE *Handles,
        __in_opt PLONG64 Timeout);
ULONG
DkPipePeek(
        __in HANDLE Handle);
// Isolated File Access
PVOID
DkFileOpen(
            __in PUNICODE_STRING pUri,
            __in_opt PVOID DesiredAddress,
            __in ACCESS_MASK DesiredAccess,
            __in ULONG ShareMode,
            __in ULONG CreateDisposition,
            __in ULONG CreateOptions,
            __in SIZE_T Offset,
            __inout_opt PSIZE_T ViewSize);
BOOL
DkFileTruncate(
        __in PUNICODE_STRING Uri,
        __in SIZE_T Length);
DKSTATUS
DkFileUnmap(
        __in PVOID addr);
BOOL
DkFileSync(
        __in PVOID addr);
BOOL
DkFileUnlink(
        __in PUNICODE_STRING Uri);
DKSTATUS
DkFileAttributesQuery(
        __in PUNICODE_STRING Uri,
        __out PDK_FILE_ATTRIBUTES Attrs);
// Threading
BOOL
DkThreadCreate(
        __in SIZE_T StackSize,
        __in PDK_THREAD_START Address,
        __in_opt PVOID Parameter,
        __in ULONG CreationFlags,
        __out_opt PHANDLE Pipe,
        __out_opt PULONG64 PipeToken);
VOID
DkThreadExit( );
BOOL
DkProcessCreate(
        __in_opt PUNICODE_STRING Appl,
        __in_opt PUNICODE_STRING CmdLin,
        __out_opt PHANDLE Pipe,
        __out_opt PULONG64 PipeToken);
VOID
DkProcessExit( );
// Other
BOOL
DkSystemTimeQuery(
        __out PLONG64 SystemTime);
BOOL
DkRandomBitsRead(
        __in out PVOID Buf,
        __in SIZE_T BufSize);
BOOL
DkDebugOutput(
        __in PUNICODE_STRING Message);
```

As mentioned above, each guest OS can use calls to the VM interface set instead of implementing the guest OS functionality directly. In some cases, a guest OS application interface is a simple wrapper for an underlying VM interface call. This can be the case for virtual memory allocation, thread creation, etc. For example, guest OS 107 and guest OS 503 may use different calling conventions for their respective memory allocation interfaces, e.g., different number, order, or names of parameters, etc. However, both guest OS 107 and guest OS 503 can implement virtual memory allocation with calls to DkVirtualMemoryAllocate.

Other guest OS functionality may be built using nontrivial binaries that still can utilize the underlying VM interfaces. For example, files, locks, timers, etc., can all be built inside of each individual guest OS. Furthermore, recall that each guest OS can also have one or more binaries that execute directly and do not necessarily use calls to the VM interface set. For example, guest OS 107 and guest OS 503 can support different interface calls for creating graphical windows. These interface calls may be implemented directly by executing the corresponding guest OS binaries which may not involve directly calling the VM interface set. In other words, unmodified guest OS binaries may be executed directly instead of modifying the guest OS to use calls to the VM interface set.

In some implementations, this is accomplished by providing modified versions of some binaries that would normally be associated with the guest OS. For example, a Windows® guest OS may include a binary called comctl32.dll that provides various graphical features such as toolbars and tabs. Comctl32.dll may, in turn, rely on calls to another binary, kernelbase.dll. Typically, guest OS 107 is distributed with both of these .dll files. In some disclosed implementations, comctl32.dll runs in execution context 105, and calls from comctl32.dll are passed to a customized version of kernelbase.dll that runs in OS VM 104 to support guest OS 107. This version of kernelbase.dll may rely on calls to the VM interface set. This is a particular example of how user mode operating system functionality can be moved into an execution context along with a supported application and an appropriate emulator.

In some implementations, applications can migrate across device boundaries to execute on a different host device. If the other host device implements the VM interface set and the host OS thereon supports the RDP protocol, this can be accomplished by copying the address space and execution context 105 over to the other host device. For example, one or more pages of memory used by guest OS 107 and/or application 108 as well as register values or other state information can be provided to the other host device.

Figure 6:
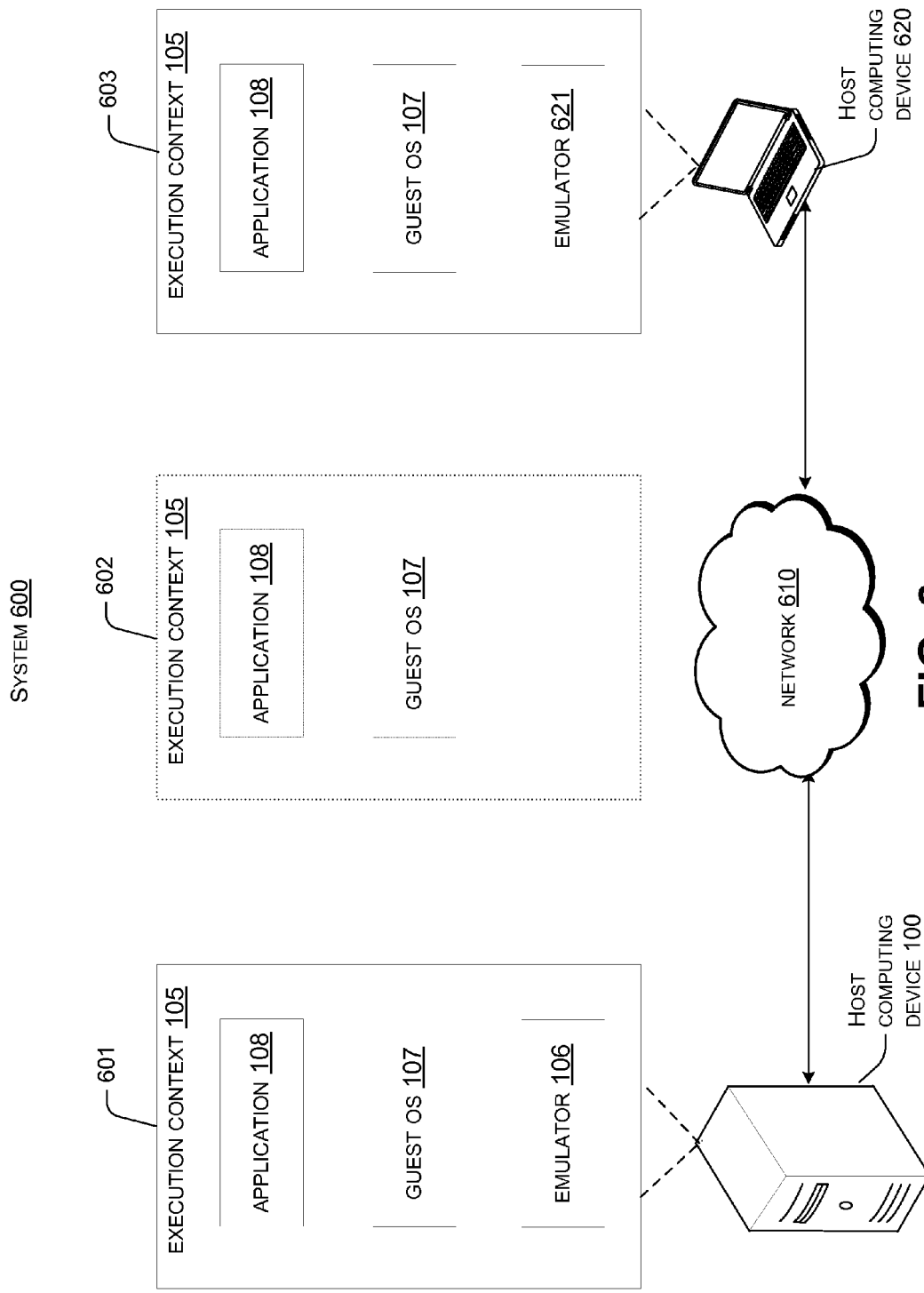
FIG. 6 shows an exemplary system in accordance with some implementations of the present concepts.

FIG. 6 illustrates a system 600 that is configured to accomplish migrating an application. System 600 can include host computing device 100 connected to a network 610. Host computing device can communicate with another host computing device 620 via network 610.

Although not shown in FIG. 6, host computing device 620 can have similar components as those set forth above with respect to host computing device 100. However, host computing device 620 can have a different native ISA than host computing device 100, and can also have a different host OS than host OS 103. If host computing device 620 correctly implements the VM interface and the RDP protocol, application 108 can be copied directly to host device 620 as shown in FIG. 6. For example, at a first time 601, execution context can be executing on host computing device 100 as discussed above. At any time, the execution state of application 108 and/or guest OS 107 can be shared by transmitting execution context 105 over network 610, as shown at a second, subsequent time 602. Host computing device 620 can receive execution context 105, instantiate a new execution context thereon, and copy execution context 105 into the new execution context. Host computing device 620 can have an emulator 621 that can function as discussed above and below with respect to emulator 106. In some implementations, state information (e.g., register values, program counter, etc.) for emulator 106 can be copied to host device 620 and used to initialize emulator 621. This may be particularly useful when host computing device 100 and host computing device 620 share a common ISA that is different than the ISA for application 108.

In the manner described above, application 108 can seamlessly transition across different ISA's and host operating systems in mid-execution. Note that, in some implementations, host computing device 620 can be preconfigured with precompiled binaries for guest OS 107. This can reduce the amount of time it takes for application 108 to be migrated.

Method Implementations

Figure 7:
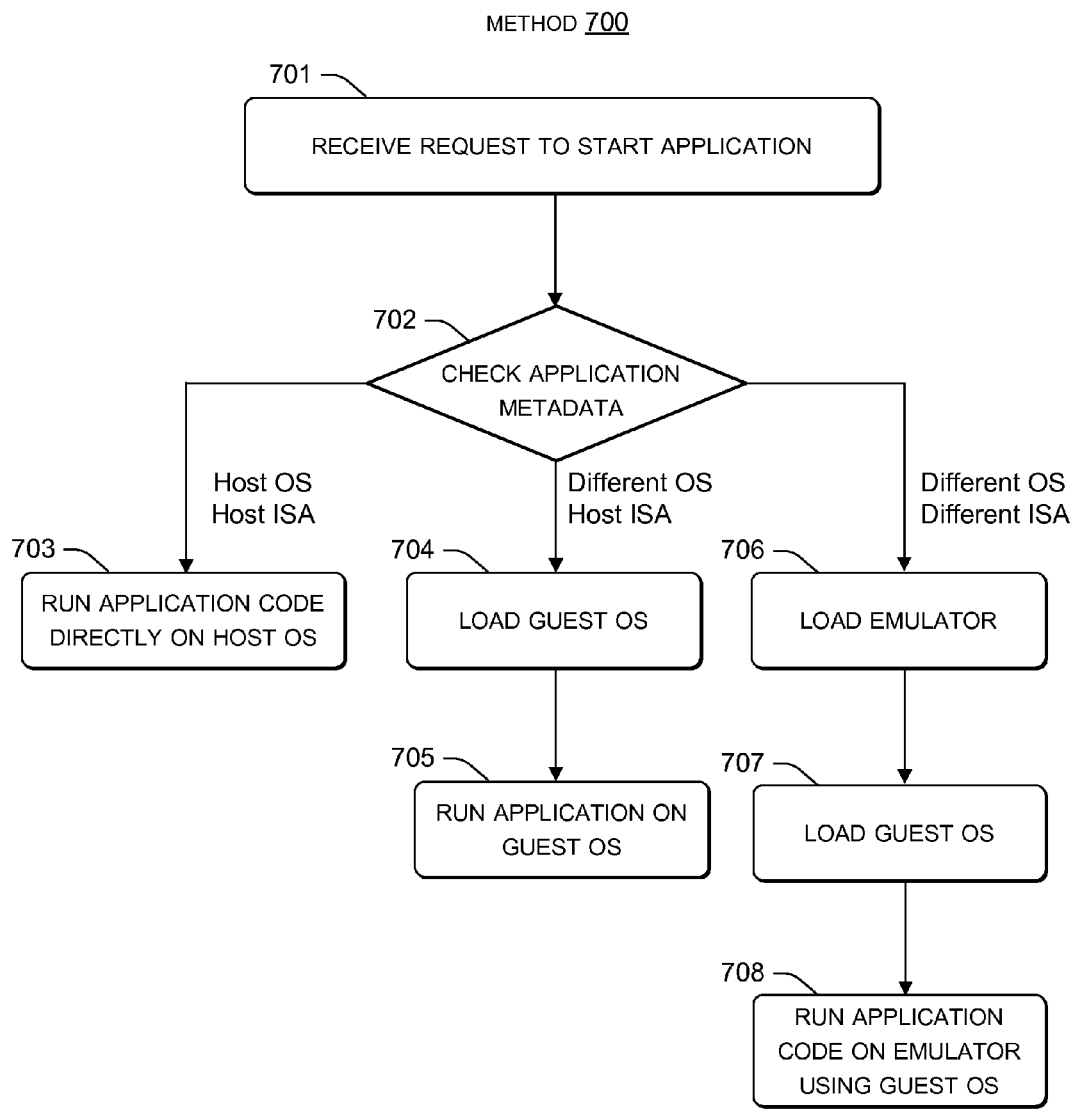
FIGS. 7-9 show flowcharts of exemplary methods that can be accomplished in accordance with some implementations of the present concepts.

FIG. 7 illustrates a method 700 that is suitable for implementation on host computing device 100 or by other devices or systems. Generally speaking, method 700 relates to loading guest operating systems and/or emulators to support a request to run an application.

A request to start an application can be received at block 701. For example, OS virtualization monitor 104 can receive a request to run an application such as application 108, 502, 506, and/or 509.

Application metadata can be checked at block 702. For example, OS VM 104 can check a manifest associated with application 108 to determine what ISA and/or operating system application 108 is configured to run. In some implementations, the application manifest can be written in a markup language such as extensible markup language ("XML").

If the application manifest indicates that the application is in the host ISA and is configured to run on the host operating system, method 700 can move to block 703. At block 703, the application can run directly on the host OS without an emulator. For example, OS VM 104 can pass the application to host OS 103. Host OS 103 can create a new execution context and run the application directly within the context. This configuration is generally illustrated by execution context 508 in FIG. 5.

If the application manifest indicates that the application is in the host ISA but is configured to run on a different operating system than the host OS, method 700 can move to block 704. At block 704, the appropriate guest OS is loaded into an execution context with the application. Next, at block 705, the application is executed in the execution context with the guest OS. This configuration is generally illustrated by execution context 505 in FIG. 5.

If the application manifest indicates that the application is in a different ISA than the host ISA and is also configured to run on a different operating system than the host OS, method 700 can move to block 706. At block 706, the appropriate emulator is loaded into an execution context. Next, at block 707, the appropriate guest OS is loaded into the execution context with the emulator. Next, at block 708, the application can run on the guest OS in the guest ISA in the execution context with the emulator and the guest OS. This configuration is generally illustrated by execution contexts 105 and 501 in FIG. 5.

Figure 8:
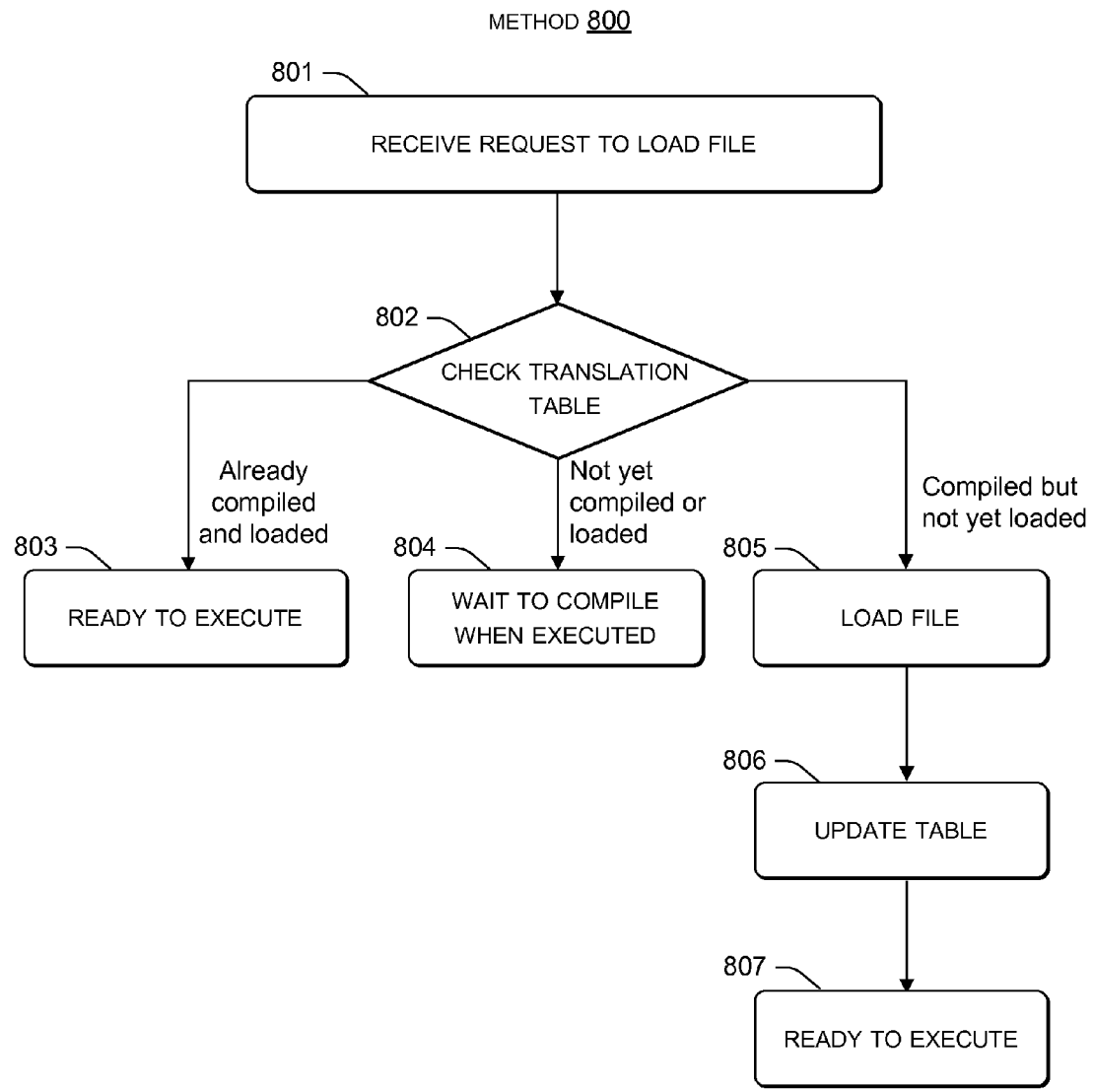

FIG. 8 illustrates a method 800 that is suitable for implementation on host computing device 100 or by other devices or systems. Generally speaking, method 800 relates to runtime support of an application by an emulator that can load precompiled code when the precompiled code is available.

A request to load a file is received at block 801. For example, emulator 106 can receive a request from application 108 and/or guest OS 107 to load a DLL or other binary file at runtime. The request can include one or more instructions in the guest ISA.

A translation table is checked at decision block 802. For example, emulator 106 can check translation table 304 using the guest ISA address of the file that application 108 and/or guest OS 107 is requesting to load. This enables emulator 106 to see if the file has already been loaded into memory, e.g., execution context 105.

If the file has already been compiled into the host ISA and loaded into memory, method 800 moves to block 803. At block 803, the file is in memory and ready to execute.

If the file has not yet been loaded (e.g., has no corresponding host ISA address in translation table 304) and has yet to be compiled (e.g., a compiled version is not available in storage), method 800 moves to block 804. At block 804, the method waits to compile the file until the file is executed. For example, in the case of a .dll file, the method can wait until at least one function from the .dll is called and then compile the file with just-in-time compiler 302 and/or interpreter 303.

If the file has already been compiled but has not yet been loaded (e.g., a compiled binary is available in storage but the file has no corresponding host ISA address in translation table 304), method 800 moves to block 805. At block 805, the file is loaded into memory. Next, at block 806, the table is updated with the address where the compiled host ISA version of the file is loaded. Next, at block 807, the file is ready to execute.

Figure 9:
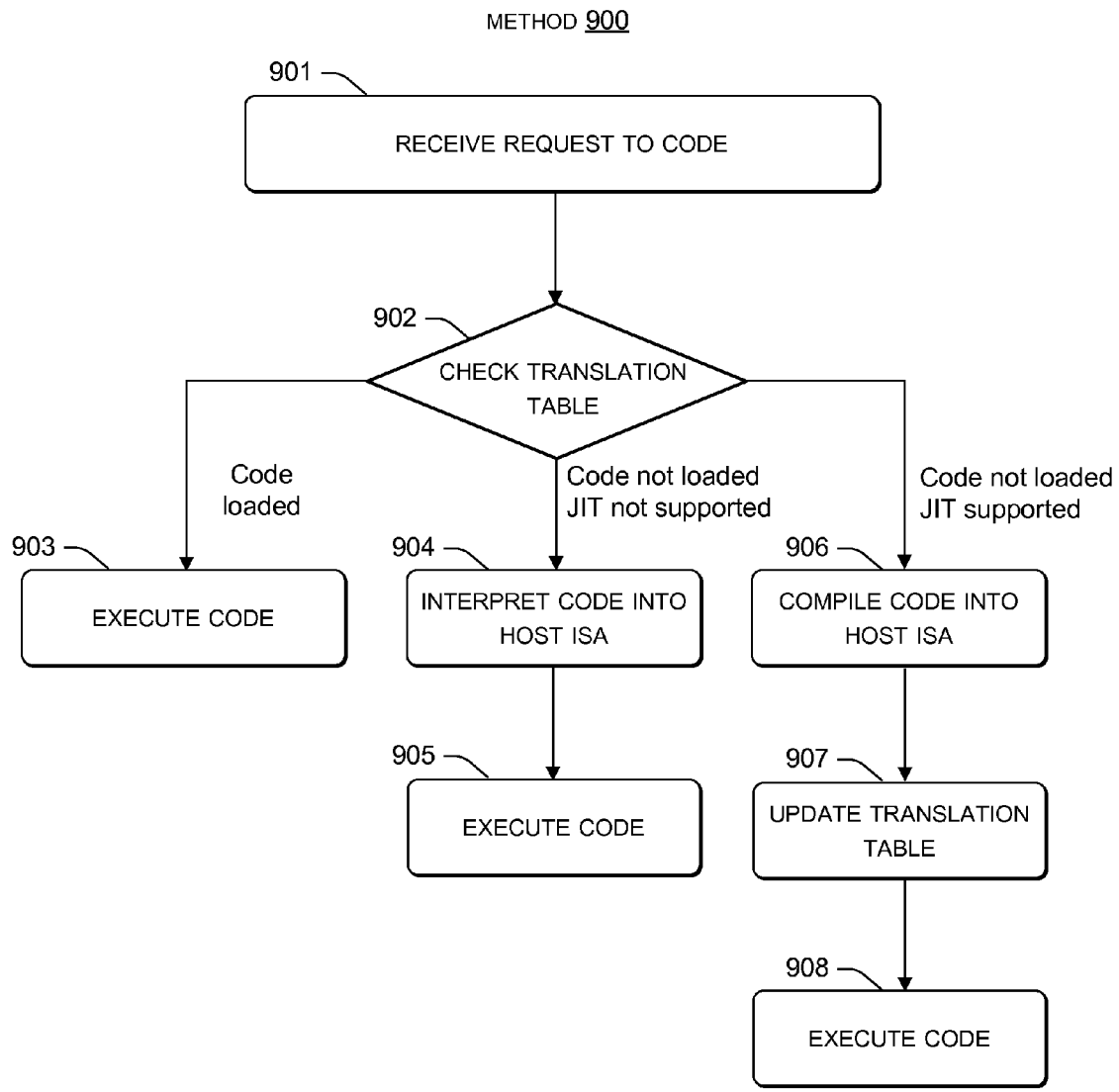

FIG. 9 illustrates a method 900 that is suitable for implementation on host computing device 100 or by other devices or systems. Generally speaking, method 900 relates to runtime support of an application by an emulator that can use precompiled code, interpreted code, and/or just-in-time compiled code.

A request to execute code is received at block 901. For example, emulator 106 can receive a request from application 108 and/or guest OS 107 to execute code at runtime. The request can include one or more instructions in the guest ISA.

A translation table is checked at decision block 902. For example, emulator 106 can check translation table 304 using the guest ISA address of the code that application 108 and/or guest OS 107 is executing. Emulator 106 can thus determine whether the code that will execute is included in a file that has already been loaded into memory.

If the code has already been loaded into memory, method 900 moves to block 903. At block 903, the code is executed.

If the code has not been loaded and just-in-time compiling is not supported or otherwise not being used, method 900 moves to block 904. At block 904, the code is interpreted into the host ISA. At block 905, the interpreted code is executed.

If the code has not yet been loaded into memory and just-in-time compiling is supported, method 900 moves to block 906. At block 906, the code that will be executed is compiled into the host ISA and loaded into memory. Next, at block 907, the translation table is updated to reflect the loaded binary is loaded in memory. Next, at block 908, the code is executed.

Note that the above discussion is largely illustrated at a file level of granularity. In other words, translation table 304 includes host ISA addresses for individual .dll files. However, note that each file can include multiple functions as well as data. In some implementations, more refined granularities can be used. For example, addresses of each function in a file can be tracked individually rather than tracking the file as a whole.

CONCLUSION

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by a host computing device, the method comprising:
 receiving a request to execute an application on the host computing device, wherein the host computing device has a corresponding host instruction set architecture and the application comprises first application instructions from a guest instruction set architecture that is different than the host instruction set architecture;
 loading a processing unit emulator and a guest operating system together into a first process with the application, wherein:
  the processing unit emulator translates the first application instructions into second application instructions in the host instruction set architecture, and
  the guest operating system provides at least one guest operating system interface that is called by the application; and
 running the application by executing the second application instructions on the host computing device,
 wherein the first process comprises a shared address space that is shared by the application, the processing unit emulator, and the guest operating system, and
 wherein the host computing device comprises a host operating system that includes a second process.

2. The method according to claim 1, further comprising:
 loading another application on the host computing system into at least one other address space.

3. The method according to claim 1, wherein the processing unit emulator also translates at least some instructions of the guest operating system from the guest instruction set architecture to the host instruction set architecture.

4. The method according to claim 3, further comprising:
 assigning different privileges to the first process and the second process with respect to individual instructions of the host instruction set architecture.

5. The method according to claim 4, the host operating system comprising host operating system instructions in the host instruction set architecture.

6. The method according to claim 3, the at least some instructions of the guest operating system being operable to display graphical features responsive to a further request received from the application.

7. The method according to claim 1, further comprising:
 providing the application with a value that indicates that the first process is non-privileged when the first process is actually privileged.

8. The method according to claim 1, further comprising:
 copying the first process from the host computing device to another host computing device, the another host computing device having another host instruction set architecture, the another host computing device comprising another emulator configured to translate the first application instructions into third application instructions from the another host instruction set architecture.

9. One or more computer-readable storage media storing instructions which, when executed by one or more processing devices, cause the one or more processing devices to perform acts comprising:
 receiving a request to execute a guest application on a host device comprising a host instruction set architecture and a host operating system, the guest application comprising one or more guest application binaries;
 checking application metadata associated with the guest application to identify a guest instruction set architecture and a guest operating system for the guest application, wherein the guest instruction set architecture is different than the host instruction set architecture; and
 in a first instance, loading the guest application, the guest operating system for the guest application, and an emulator configured to translate the one or more guest application binaries into the host instruction set architecture together in a single process.

10. The one or more computer-readable storage media of claim 9, the acts further comprising:
 enforcing a single set of permissions for the single process into which the guest application, the emulator, and the guest operating system are loaded, the single set of permissions restricting at least some operations of the guest operating system, the guest application, and the emulator.

11. The one or more computer-readable storage media according to claim 10, the enforcing comprising restricting access to at least one file.

12. The one or more computer-readable storage media according to claim 9, the acts further comprising:
 in a second instance, loading another guest application comprising one or more other guest application binaries in another guest instruction set architecture, another emulator configured to translate the one or more other guest application binaries into the host instruction set architecture, and another guest operating system together in another single process.

13. The one or more computer-readable storage media according to claim 12, wherein the guest instruction set architecture, the another guest instruction set architecture, and the host instruction set architecture comprise three different instruction set architectures.

14. The one or more computer-readable storage media according to claim 13, wherein the guest operating system, the another guest operating system, and the host operating system comprise three different operating systems.

15. A computing device comprising:
 at least one processing unit having an associated native instruction set architecture; and
 at least one memory or storage device storing native instructions in the native instruction set architecture that, when executed by the at least one processing unit, cause the at least one processing unit to:
- receive a request to execute a guest application, the guest application comprising one or more guest application binaries;
- identify a guest instruction set architecture and a guest operating system for the guest application, wherein the guest instruction set architecture is different than the native instruction set architecture;
- load the guest application, the guest operating system for the guest application, and an emulator together in a shared execution context; and
- translate the one or more guest application binaries into the native instruction set architecture using the emulator that is loaded into the shared execution context with the guest application and the guest operating system.

16. The computing device of claim 15, wherein the native instructions cause the at least one processing unit to:
- provide a virtualization monitor that implements a virtualization monitor interface;
- receive a first call of the virtualization monitor interface from the guest operating system to the virtualization monitor; and
- translate the first call into a corresponding second call to a host operating system interface implemented by a host operating system of the computing device.

17. The computing device of claim 16, wherein the native instructions cause the at least one processing unit to:
- assign the shared execution context a level of privilege that prevents the shared execution context from executing at least one privileged instruction, wherein the corresponding second call includes the at least one privileged instruction.

18. The computing device of claim 17, wherein the first call requests to access a file and the corresponding second call accesses the file on behalf of the guest application.

19. The computing device of claim 17, wherein the first call requests to create a new thread and the corresponding second call creates the new thread on behalf of the guest application.

* * * * *